(12) United States Patent
Iwao et al.

(10) Patent No.: US 8,417,936 B2
(45) Date of Patent: Apr. 9, 2013

(54) NODE APPARATUS, METHOD AND STORAGE MEDIUM

(75) Inventors: Tadashige Iwao, Kawasaki (JP); Kentaro Masubuchi, Kawasaki (JP); Chiaki Nakajima, Kawasaki (JP); Kentaro Ikemoto, Kawasaki (JP); Syunsuke Koga, Fukuoka (JP); Yuji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 113 days.

(21) Appl. No.: 12/908,508

(22) Filed: Oct. 20, 2010

(65) Prior Publication Data

US 2011/0093717 A1 Apr. 21, 2011

Related U.S. Application Data

(63) Continuation of application No. PCT/JP2009/001903, filed on Apr. 24, 2009.

(30) Foreign Application Priority Data

Apr. 24, 2008 (JP) ................. 2008-113530

(51) Int. Cl.
*H04L 29/06* (2006.01)
(52) U.S. Cl. ..................................... 713/150
(58) Field of Classification Search .............. None
See application file for complete search history.

(56) References Cited

U.S. PATENT DOCUMENTS

| | | | |
|---|---|---|---|
| 5,832,092 A | 11/1998 | Okuda et al. | |
| 7,228,422 B2 | 6/2007 | Morioka et al. | |
| 2002/0037736 A1 | 3/2002 | Kawaguchi et al. | |
| 2003/0210787 A1 | 11/2003 | Billhartz et al. | |
| 2004/0228492 A1 | 11/2004 | Park | |
| 2005/0215234 A1 | 9/2005 | Fukuzawa et al. | |
| 2007/0076886 A1 | 4/2007 | Hori et al. | |
| 2008/0063210 A1* | 3/2008 | Goodman et al. | 380/286 |

FOREIGN PATENT DOCUMENTS

| | | |
|---|---|---|
| CN | 101110831 | 1/2008 |
| JP | 9-321748 | 12/1997 |
| JP | 2002-111679 | 4/2002 |

(Continued)

OTHER PUBLICATIONS

Tadashige Iwao et al., "Multipurpose Practical Sensor Network: S-wire," Fujitsu, vol. 57, No. 3, May 2006, p. 285-290.

(Continued)

*Primary Examiner* — Brandon Hoffman
(74) *Attorney, Agent, or Firm* — Staas & Halsey LLP

(57) ABSTRACT

A node apparatus changes a first access key unique to itself; changes a shared key same for node apparatuses; encrypts, using the shared key, the first access key and transmits it; receives an access key notification frame; decrypts it using the shared key, thereby obtaining a second access key; attaches, to a first plaintext frame, first signature data obtained by encrypting, using the shared key, data including a first value calculated from the first plaintext frame; encrypts the first plaintext frame using the second access key and transmits thus encrypted frame; receives a second encrypted frame; decrypts it by the first access key to obtain a second plaintext frame; obtains a second value by decrypting, using the shared key, a second signature data attached to the second plaintext frame; calculates a third value from the second plaintext frame; and confirms whether the second and third values are consistent.

7 Claims, 21 Drawing Sheets

FOREIGN PATENT DOCUMENTS

| | | |
|---|---|---|
| JP | 2004-56762 | 2/2004 |
| JP | 2004-194295 | 7/2004 |
| JP | 2004-343717 | 12/2004 |
| JP | 2005-278044 | 10/2005 |
| JP | 2006-121545 | 5/2006 |
| JP | 2006-514789 | 5/2006 |
| JP | 2007-104310 | 4/2007 |

OTHER PUBLICATIONS

International Search Report for PCT/JP2009/001903, mailed Jun. 2, 2009.

Chinese Office Action mailed Jan. 14, 2013 in corresponding Chinese Application No. 200980113336.6.

* cited by examiner

| FRAME ||||SIGNATURE |
|---|---|---|---|---|
| HEADER | FID | TIME | BODY | KT(HASH(FRAME)) |

FIG. 8

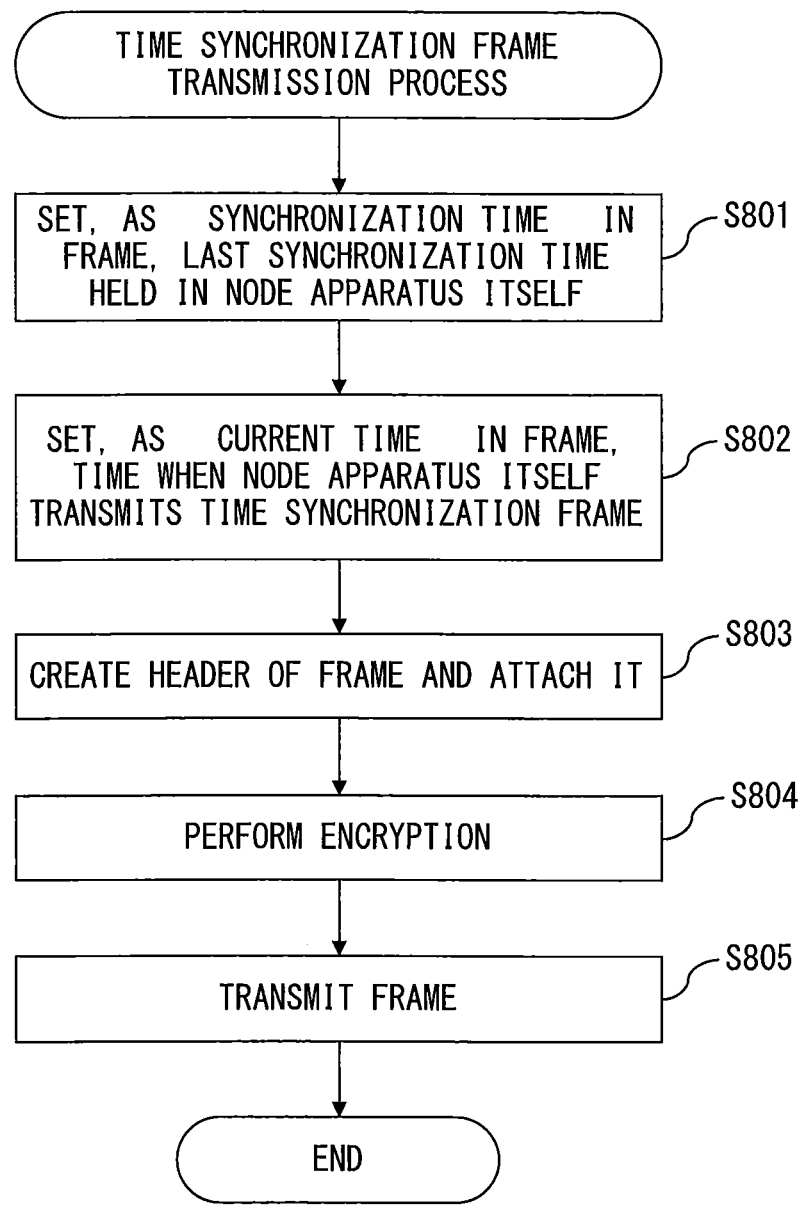
F I G. 2 0

NODE APPARATUS, METHOD AND STORAGE MEDIUM

CROSS REFERENCE TO RELATED APPLICATIONS

This is a continuation of PCT application PCT/JP2009/001903, which was filed on Apr. 24, 2009 based upon the prior Japanese Patent Application No. 2008-113530 filed on Apr. 24, 2008. This continuation application also claims the benefit of priority of Japanese Patent Application No. 2008-113530. The entire contents of PCT application PCT/JP2009/001903 and Japanese Patent Application No. 2008-113530 are incorporated herein by reference.

FIELD

The present invention relates to an apparatus and a program for security maintenance in an autonomous distributed network.

BACKGROUND

Encryption of transmission data is performed as a security measure. Shared-key cryptography (also called symmetric-key cryptography) is one of the methods for encryption. Meanwhile, to further enhance security, there is a technique of changing the shared key at predetermined time intervals, as the well-known art described below.

In addition, there are security systems such as WEP (Wired Equivalent Privacy) and WPA (Wi-Fi Protected Access). According to these techniques, the authentication process is performed generally by issuing a control instruction in a server.

Meanwhile, in a communication system, a technique to change the common cryptographic key by changing only the control variable of the server while keeping the security code at the client side unchanged has been disclosed (for example, Japanese Laid-open Patent Publication No. 9-321748). This makes it possible to improve the security of a cryptographic system by changing the common shared key at short time intervals.

SUMMARY

A node apparatus of the first aspect is a first node apparatus in a network constituted by a plurality of node apparatuses including the first node apparatus and a second node apparatus, and has an access key generation unit, a shared key generation unit, an access key notification unit, an access key reception unit, an access key decryption unit, a data transmission unit, a data reception unit, a data decryption unit and a consistency confirmation unit.

The access key generation unit changes and generates a first access key being a cryptographic key unique to the first node apparatus at intervals of a first time. Meanwhile, the shared key generation unit changes and generates a shared key being same for the plurality of node apparatuses in the network at intervals of a second time being same for the plurality of node apparatuses.

The access key notification unit encrypts, using the generated shared key and transmits, to the second node apparatus, the generated first access key. The access key reception unit receives an access key notification frame that is transmitted from the second node apparatus and that includes access key notification data being data obtained by encrypting a second access key being a cryptographic key unique to the second node apparatus using the shared key.

The access key decryption unit obtains the second access key from the access key notification data by decrypting the access key notification data using the generated shared key.

The data transmission unit attaches, to a first plaintext frame, first signature data obtained by encrypting, using the shared key, data including a first hash value calculated from the first plaintext frame. Then, the data transmission unit encrypts the first plaintext frame, to which the first signature data is attached, into a first encrypted frame using the second access key obtained by decryption, and transmits the first encrypted frame.

The data reception unit receives a second encrypted frame from the second node apparatus. Here, the second encrypted frame is obtained by encrypting, by the first access key, a second plaintext frame to which a second signature data obtained by encrypting data including a second hash value by the shared key is attached.

The data decryption unit decrypts the second encrypted frame by the first access key to obtain the second plaintext frame, to which the second signature data is attached, from the second encrypted frame.

The consistency confirmation unit obtains the second hash value by decrypting the second signature data using the generated shared key. The consistency confirmation unit also calculates a third hash value from the second plaintext frame, and confirms whether or not the second hash value and the third hash value are consistent with each other.

A program of the second aspect is a program executed by a computer that controls a first node apparatus in a network constituted by a plurality of node apparatuses including the first node apparatus and a second node apparatus. The program is a program to cause the computer to control the first node apparatus of the second aspect so that the first node apparatus of the second aspect operates in a similar manner as the first node apparatus of the first aspect.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating a format of a data frame.

FIG. 20 is a flowchart of a time synchronization frame transmission process.

DESCRIPTION OF EMBODIMENTS

Hereinafter, embodiments of the present invention are described in detail with reference to drawings.

Regardless of wired or wireless, considering a network including a very large number of node apparatuses, it is not practical that one management server generates a shared key (that is, changes it according to time) and notifies each node apparatus of it. In other words, since there are a large number of node apparatuses, it places significant burden just to transmit control instructions from the server. For this reason, it is desirable that each node apparatus performs the operation for encryption autonomously and in cooperation with other node apparatuses.

An objective of the following embodiments is to provide a node apparatus to perform an operation for encryption autonomously and in cooperation with other node apparatuses. Another objective of the following embodiments is to provide a program to instruct a node apparatus to perform an operation for encryption autonomously and in cooperation with other node apparatuses.

As described below in detail, according to any of the following embodiments, a node apparatus in a network is capable of performing an operation for encrypted communication autonomously and in cooperation with other node apparatuses. Therefore, the security of communication in the network including a plurality of node apparatuses can be enhanced.

Figure 1:
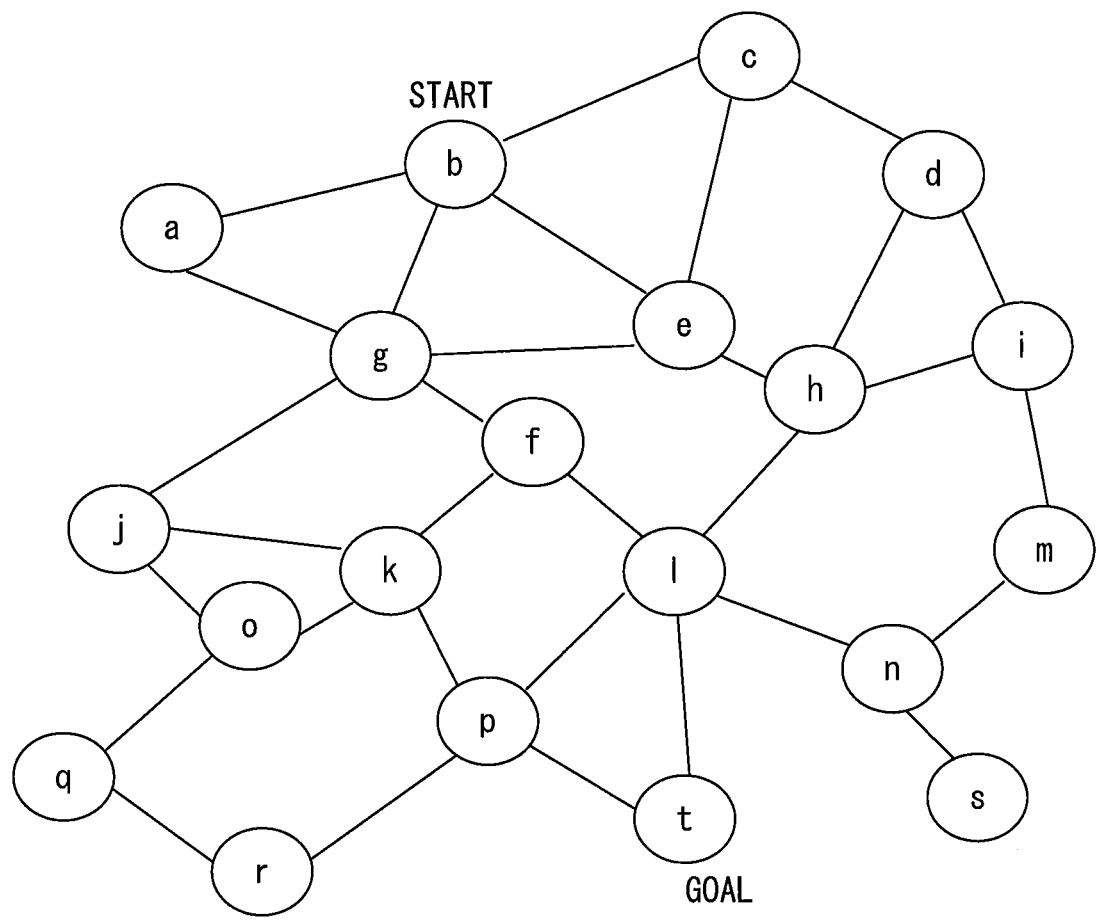
FIG. 1 is a general concept diagram of an ad hoc communication system.

FIG. 1 is a general concept diagram of an ad hoc communication system. As illustrated in FIG. 1, node apparatuses (a, b, . . . , s, t) are connected with each other to constitute a network. In the ad hoc communication system, respective node apparatuses operate as repeaters, and transmit information from a start node (in the example of FIG. 1, the node apparatus b) to a goal node (in the example of FIG. 1, the node apparatus t).

Each node apparatus has a node ID that is unique identification information (ID, Identification). MAC (Media Access Control) address may be used as a node ID.

Each node apparatus does not recognize its adjacent node apparatuses or the entire network. In the initial status, links between them do not exist, and each node apparatus does not recognize any node apparatus other than itself.

Therefore, in the ad hoc communication system illustrated in FIG. 1, in order to transmit information from the node apparatus b being the start node to the node apparatus t being the goal node, the route needs to be determined first. Procedures to determine the route are as described below.

First, each node apparatus detects node apparatuses in its surroundings. In order for that, each node apparatus periodically notifies node apparatuses existing in its vicinity, of the existence of itself. The notification to the node apparatuses in the vicinity is accompanied with information related to route generation. Upon receiving notification from other node apparatuses, each node apparatus can create a list of node apparatuses in the surroundings and recognize other node apparatuses existing in the surroundings of the node apparatus itself.

A node apparatus that has detected node apparatuses in the surroundings determines, based on the created list, a node apparatus to which the node apparatus itself is to forward information, and then it forwards the information to the determined node apparatus.

Each node apparatus conduct communication with a partner node apparatus while encrypting frames for a security measure. Specifically, each node apparatus performs encryption using a cryptographic key that is unique to the node apparatus being the communication partner and a shared key that is shared among node apparatuses in the network, and transmits information to the node apparatus being the communication partner. Meanwhile, upon receiving information from a node apparatus being the communication partner, each node apparatus takes out information by decrypting a frame using a cryptographic key that is unique to the node apparatus itself and the above-mentioned shared key.

Thereafter, in a similar manner, in the communication between node apparatuses, each node apparatus performs data transmission to a node apparatus being the communication partner, while using a cryptographic key obtained by decryption. Meanwhile, each node apparatus authenticate a node apparatus being the communication partner if received data is encrypted by the cryptographic key that the node apparatus itself generated.

Hereinafter, an authentication process and a method of communication by the node apparatuses according to the present embodiment are specifically described.

Figure 2:
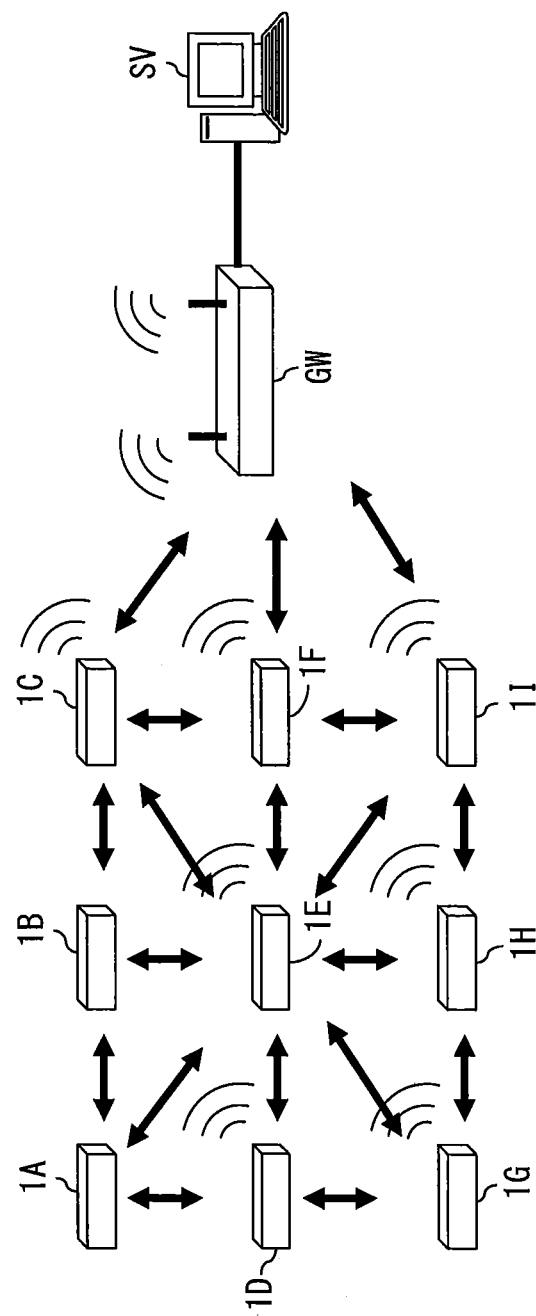
FIG. 2 is a network configuration diagram illustrating an example of a sensor network including a plurality of node apparatuses.

The node apparatus according to the present embodiment may be used in any ad hoc communication system as illustrated in FIG. 1, and may also be used, for example, as in FIG. 2, in a sensor network realized by an ad hoc network.

FIG. 2 illustrates a network configuration diagram illustrating an example of a sensor network including a plurality of node apparatuses.

In the sensor network in FIG. 2, a plurality of node apparatuses 1A-1I and a gateway apparatus GW constitute an ad hoc network. In addition, the gateway apparatus GW is connected to a server SV by, for example, a cable. Of course, the connection between the gateway apparatus GW and the server SV may be connection via a network or may be wireless connection.

In FIG. 2, each of the plurality of node apparatuses 1A-1I is connected to one or more sensors that are not illustrated in the drawing, or has one or more built-in sensors that are not illustrated in the drawing. Hereinafter, to simplify description, it is assumed that each of the node apparatuses 1A-1I is connected to one sensor respectively. The sensor may be, for example, a sensor that senses the temperature, atmospheric pressure, acceleration or the like. In addition, a plurality of different types of sensors may be used.

Each of the node apparatuses 1A-1I obtains, from the sensor connected to the node apparatus itself, data (hereinafter, referred to as "sensor data") representing the result sensed by the sensor. Then, each of the node apparatus 1A-1I generates an encrypted frame (hereinafter, referred to as a "sensor data frame") including the obtained sensor data, and transmits the sensor data frame to the gateway apparatus GW through the ad hoc network.

For example, each sensor may output sensor data to the node apparatus once a minute. Therefore, when each of the node apparatuses 1A-1I is connected to one sensor respectively as described above, each of the node apparatuses 1A-1I is led to transmit the sensor data frame once a minute.

The gateway apparatus GW, as well as each of the node apparatuses 1A-1I, has respective units illustrated in FIG. 3 explained later, and is capable of building an ad hoc network autonomously and in cooperation with the node apparatuses 1A-1I. In other words, the shared key is the same for the node apparatuses 1A-1I and the gateway apparatus GW, and the fixed key for time synchronization described later is also the same for them.

The gateway apparatus GW transmits, to the server SV, the sensor data included in the sensor data frame that was transmitted from each of the node apparatuses 1A-1I. For example, the gateway apparatus GW may operate as follows.

The gateway apparatus GW decrypts the received sensor data frame and extracts the sensor data. Then, the gateway apparatus GW transmits data including the extracted sensor data to the server SV.

Alternatively, the gateway apparatus GW may further extract, from the received sensor data frame, identification information of the source node apparatus (one of 1A-1I) of the sensor data frame. Then, the gateway apparatus GW may generate an encrypted frame including, in its payload, data obtained by encrypting data including the sensor data and the identification data, and may transmit it to the server SV.

The server SV is capable of performing various arbitrary processes based on the physical quantity sensed by the sensor, using the collected sensor data. For example, when each sensor is a temperature sensor, the server SV may perform a process to investigate temperature distribution or temperature change, or may perform temperature prediction process.

By using the node apparatuses 1 according to the present embodiment described in detail later as the node apparatuses 1A-1I in FIG. 2, the server SV can collect the sensor data while keeping it in secret, and furthermore, can collect proper sensor data that is not tampered.

Figure 3:
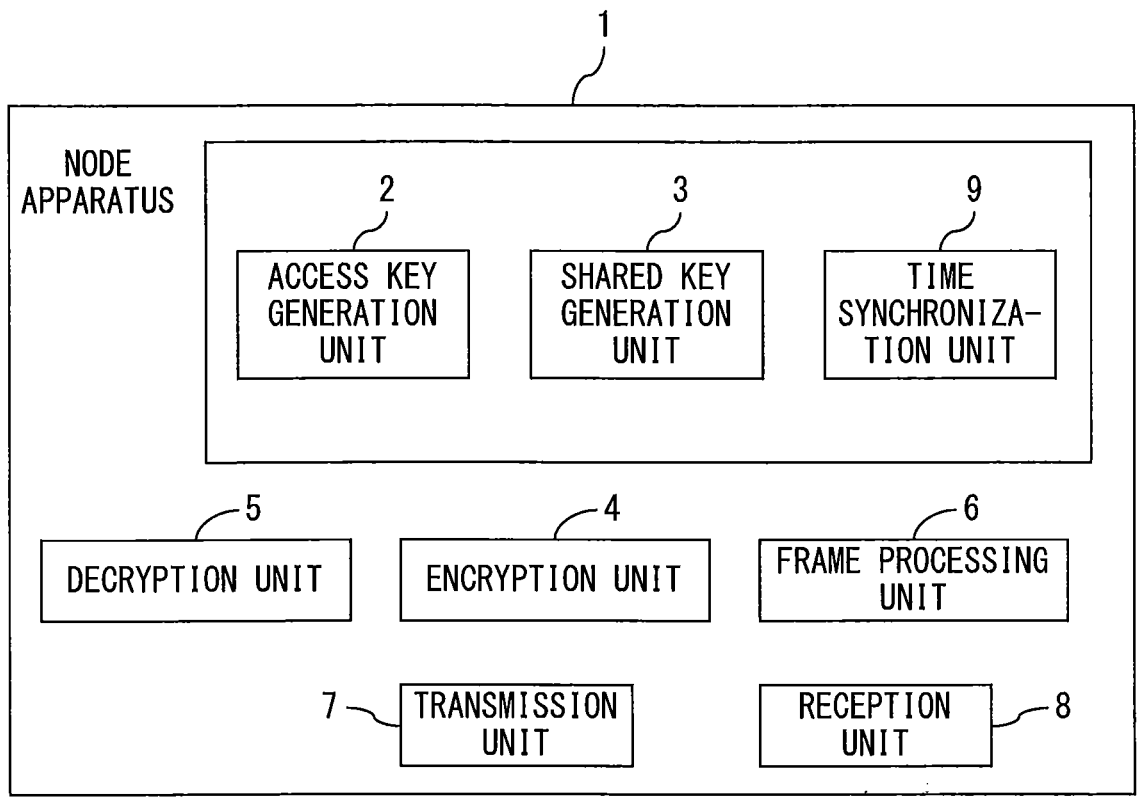
FIG. 3 is a configuration diagram of anode apparatus according to an embodiment.

FIG. 3 illustrates a configuration diagram of a node apparatus according to the present embodiment. The node apparatus 1 illustrated in FIG. 3 has an access key generation unit 2, a shared key generation unit 3, an encryption unit 4, a decryption unit 5, a frame processing unit 6, a transmission unit 7, a reception unit 8, and a time synchronization unit 9. For example, each of the node apparatuses 1A-1I in FIG. 2 has a configuration such as the one illustrated in FIG. 3.

The access key generation unit 2 generates a cryptographic key (hereinafter, referred to as an "access key") that is unique to the node apparatus 1. The access key is generated using known techniques such as WEP and WPA. The access key is generated and used as a cryptographic key in the symmetric-key cryptography.

In addition, the access key is updated randomly at a predetermined time intervals of $t_1$. In this embodiment, for example, $t_1$=10 (minutes).

Meanwhile, the access key is encrypted by RC4 (Rivest's Cipher 4) and transmitted to another node apparatus, and the length of the access key is 128 bits in this embodiment. Since RC4 is a type of stream ciphers, the length of the ciphertext encrypted by RC4 is equal to the length of the original plaintext.

Incidentally, generally, it is said that collection of 500,000 frames and 1,000,000 frames is required for cryptanalysis of RC4 whose key length is 64 bits and 128 bits, respectively. In this regard, as described above, the access key changes randomly at intervals of $t_1$=10 minutes in the present embodiment.

For example, as exemplified with regard to FIG. 2, assuming that one frame per minute is transmitted generally, ten frames are transmitted in ten minutes. Then, for example, in the example of FIG. 2, the gateway apparatus GW that is the final destination of the sensor data frames receives the largest number of frames in the ad hoc network. However, even for the gateway apparatus GW, the number of frames to receive in a case of receiving data from, for example, a total of 500 node apparatuses is about 500 frames per minute. Therefore, it can be said that it is practically impossible for a fraudulent node apparatus to collect frames required for cryptanalysis within 10 minutes that it takes for the access key to be updated.

The shared key generation unit 3 generates a shared key that is a cryptographic key being the same for the node apparatuses in the network in FIG. 1, by a tamper-resistant device (for example, a tamper-resistant PIC microcomputer 14 in FIG. 4 described later) provided in the node apparatus 1. The shared key is updated at predetermined time intervals $t_2$. In this embodiment, for example, $t_2$=12 (hours).

The time information held in each node apparatus is synchronized within the network. For this reason, the shared key is the same for the node apparatuses in the network at a certain time point, although changing depending on time.

The encryption unit 4 performs encryption of data included in a frame to be transmitted to another node apparatus, and the decryption unit 5 performs decryption of data included in a frame having been encrypted and transmitted from another node apparatus.

The transmission unit 7 transmits an encrypted frame including encrypted data generated in the node apparatus 1 illustrated in FIG. 3 to another node apparatus, and the reception unit receives an encrypted frame transmitted from another node apparatus.

The frame processing unit 6 performs processing of a received frame. For example, the frame processing unit 6 may take out information from a predetermined field of a received frame and may perform decision of "whether or not it is a frame that has already been received" as the above-mentioned "processing of a received frame". Alternatively, the frame processing unit 6 may take out information from a predetermined field of a received frame, and may perform processes such as decision of "whether or not it is a frame transmitted from an authentic node apparatus" as the above-mentioned "processing of a received frame".

The frame processing unit 6 further performs a process to create a frame to be transmitted.

The time synchronization unit 9 performs a process to synchronize the time held in the node apparatus 1 illustrated in FIG. 3 with the time of another apparatus in the network. Details of the operation of the time synchronization unit 9 are described later with FIG. 18-FIG. 21.

Before starting communication with another node apparatus in the network, the node apparatus 1 illustrated in FIG. 3 exchanges an access key encrypted using a shared key with a partner node apparatus. The access key encrypted by the shared key is stored in a predetermined field of a frame in a predetermined format called a "hello frame" for example and transmitted to the partner node apparatus.

Meanwhile, hereinafter, for the convenience of description, an access key generated by the node apparatus 1 itself may be referred to as an "internally-originated access key", and an access key received from another node apparatus may be referred to as an "externally-originated access key".

The node apparatus 1 in FIG. 3 decrypts the encrypted access key received from the communication partner node apparatus (a second node apparatus not illustrated in the drawing having a similar configuration with the node apparatus 1 in FIG. 3) using the shared key held in the node apparatus 1 itself. Then, after that, when the node apparatus 1 in FIG. 3 performs communication with the second node apparatus not illustrated in the drawing, it performs encryption of a frame addressed to the second node apparatus not illustrated in the drawing using the access key (that is, the externally-originated access key) obtained by the decryption.

As described above, the shared key and the access key are updated at predetermined time intervals $t_2$ and $t_1$, respectively. For this reason, even if a third party fraudulently obtains the shared key or the access key at a certain point of time, fraudulent access such as spoofing is impossible.

Figure 4:
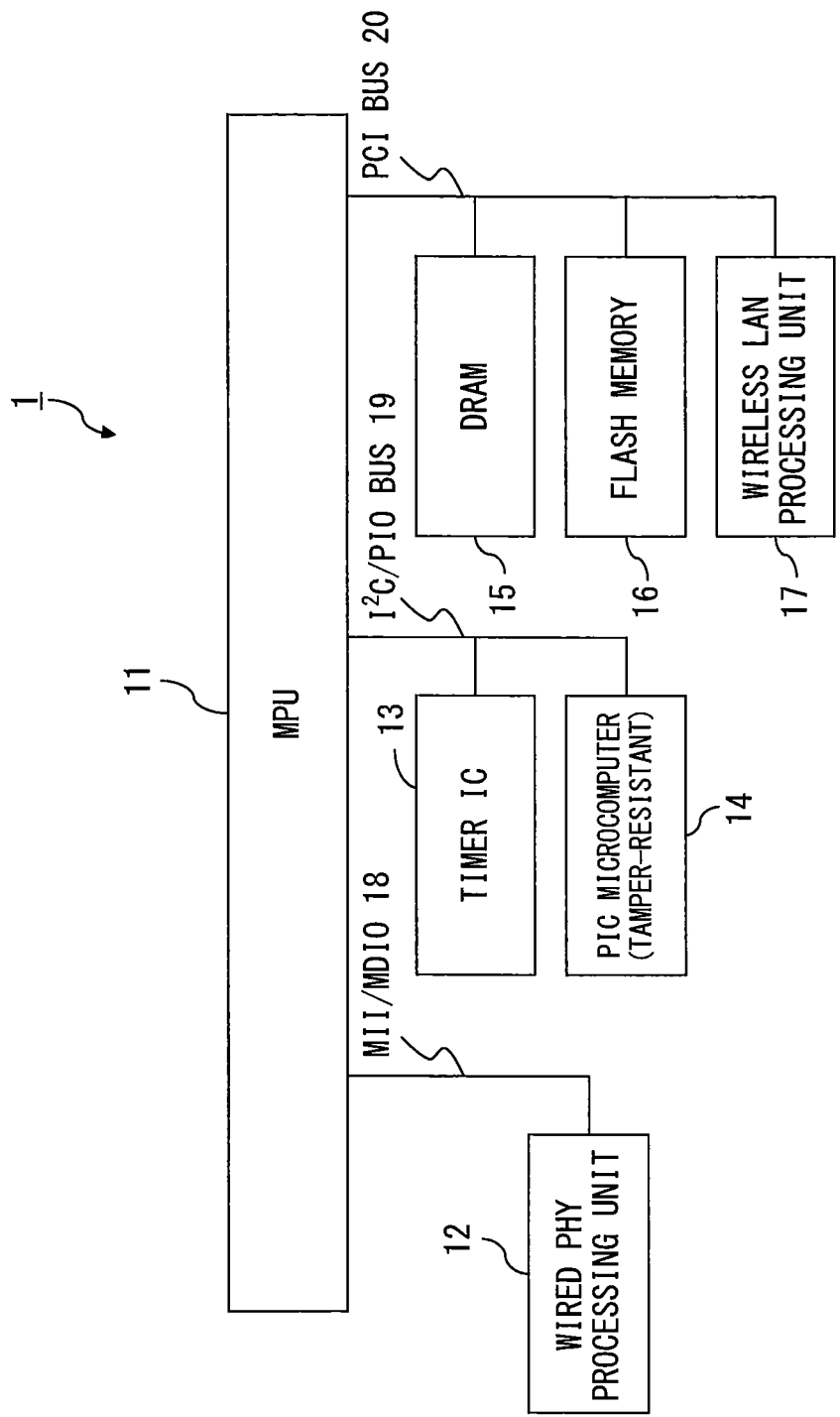
FIG. 4 is a hardware configuration diagram of a node apparatus according to an embodiment.

Next, a specific example of hardware to realize the configuration of FIG. 3 is described with reference to FIG. 4. FIG. 4 is the hardware configuration diagram of the node apparatus 1 according to the embodiment.

The node apparatus 1 in FIG. 3 has an MPU (MicroProcessing Unit) 11, a wired PHY (PHYsical layer) processing unit 12, a timer IC (Integrated Circuit) 13, and a tamper-resistant PIC (Peripheral Interface Controller) microcomputer 14. The node apparatus 1 further has a DRAM (Dynamic Random Access Memory) 15, a flash memory 16 and a wireless LAN (Local Area Network) processing unit 17.

The connection interface between the MPU 11 and the wired PHY processing unit 12 is, for example, an MII (Media Independent Interface)/MDIO (Management Data Input/Output) 18 (where "MII/MDIO" means "MII or MDIO"). MII and MDIO are both interfaces between the physical layer and the MAC sublayer (Media Access Control sublayer).

In addition, the timer IC 13 and the tamper-resistant PIC microcomputer 14 are connected to the MPU 11 by an I²C (Inter-Integrated Circuit)/PIO (Parallel Input/Output) bus 19 (where an "I²C/PIO bus" means "an I²C bus or a PIO bus").

The DRAM 15, the flash memory 16 and the wireless LAN processing unit 17 are connected to MPU 11 by a PCI (Peripheral Component Interconnect) bus 20.

The MPU 11 performs various processes by loading, on the DRAM 15, and executing various programs such as firmware stored in the flash memory 16 being a type of a nonvolatile memory device. The MPU 11 performs various programs such as a driver of the tamper-resistant PIC microcomputer 14 and a firmware program(s) to cause the node apparatus 1 to execute various processes described later.

Meanwhile, various data such as a cryptographic key may be stored in the DRAM 15. In addition, the DRAM 15 is also used as a transmission buffer and a reception buffer of a frame. The flash memory 16 stores a firmware program and the like, as described above. In addition, the flash memory 16 also stores information (for example, the node ID and/or the MAC address) that is unique to the node apparatus 1 itself.

The wired PHY processing unit 12 is a circuit to perform processing of the physical layer in wired connection. Meanwhile, the wireless LAN processing unit 17 is hardware to perform processing of the physical layer in wireless LAN connection. The wireless LAN processing unit 17 includes, for example, an antenna, an ADC (Analog-to-Digital Converter), a DAC (Digital-to-Analog Converter), a modulator, a demodulator and the like, and performs processing of the physical layer and the MAC sublayer. Therefore, in this embodiment, the node apparatus 1 is capable of performing wired communication and wireless communication. However, an embodiment in which the node apparatus 1 only performs either wired communication or wireless communication is also possible.

The timer IC 13 is a circuit that performs a count-up operation until the set time passes, and outputs an interrupt signal when the set time passes.

The tamper-resistant PIC microcomputer 14 is a microcomputer in which a predetermined algorithm to generate a shared key is embedded. Since the tamper-resistant PIC microcomputer 14 is tamper-resistant, what specifically the predetermined algorithm to generate the shared key is like cannot be analyzed externally.

Figure 5:
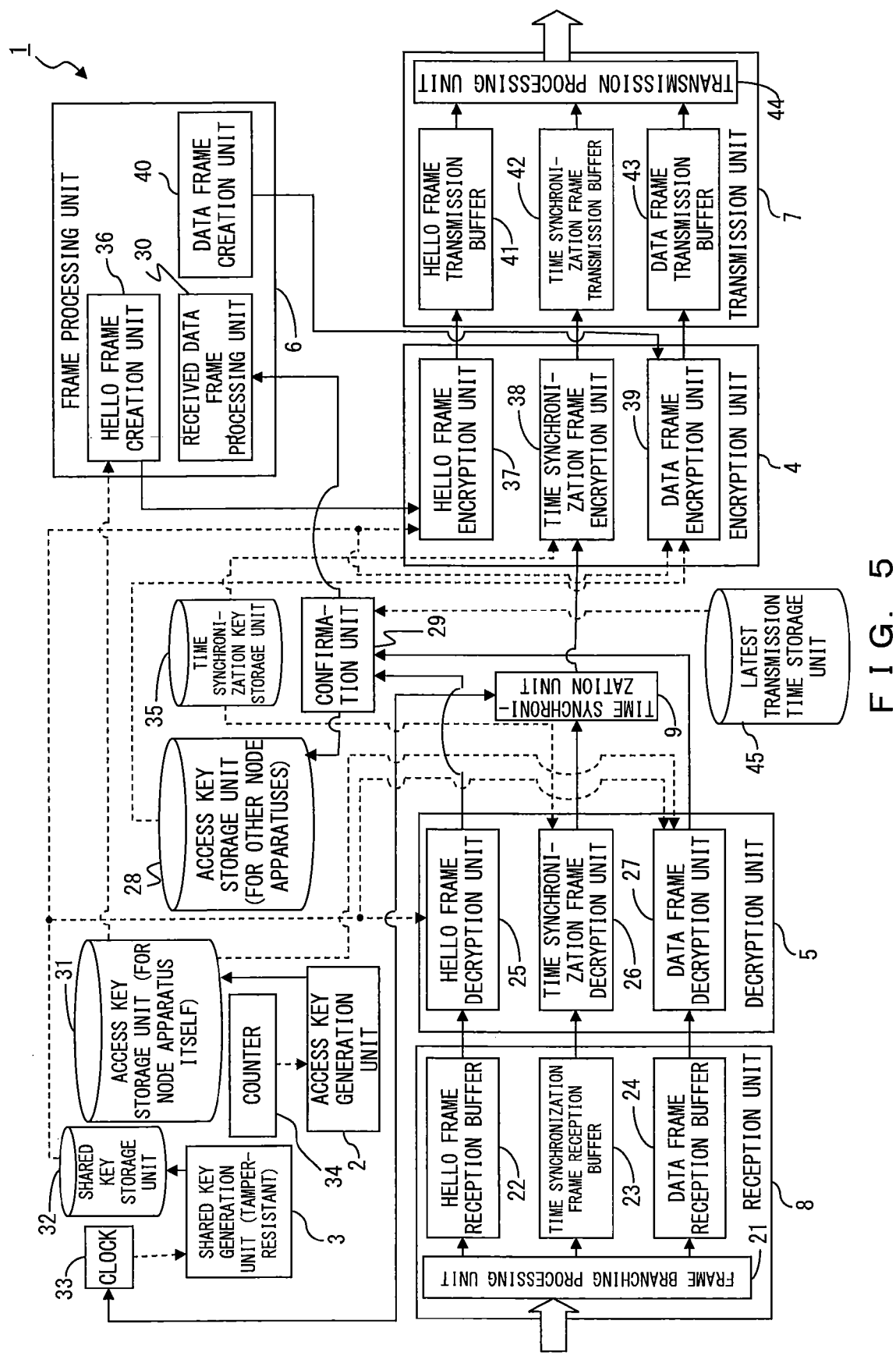
FIG. 5 is a diagram illustrating the configuration of a node apparatus according to the embodiment in greater detail.

Next, the configuration of the node apparatus 1 described with reference to FIG. 3 and FIG. 4 is described in greater detail with reference to FIG. 5. FIG. 5 is a diagram that illustrates the configuration of the node apparatus 1 according to the present embodiment in greater detail.

FIG. 5 illustrates the access key generation unit 2, the shared key generation unit 3, the encryption unit 4, the decryption unit 5, the frame processing unit 6, the transmission unit 7, the reception unit 8 and the time synchronization unit 9 that are the same as in FIG. 3.

As illustrated in FIG. 5, the reception unit 8 has a frame branching processing unit 21 to categorize frames received by the node apparatus 1 according to the type of the frames, and a reception buffer for each frame type. The reception buffer is realized by the DRAM 15 in FIG. 4 for example.

Specifically, in the present embodiment, the reception unit 8 has a hello frame reception buffer 22, a time synchronization frame reception buffer 23 and a data frame reception buffer 24 corresponding to three types of the hello frame, the time synchronization frame and the data frame, respectively.

The frame branching processing unit 21 is realized by, for example, the wireless LAN processing unit 17 and the MPU 11, or by the wired PHY processing unit 12 and the MPU 11. As described later with FIG. 12, FIG. 15 and FIG. 17, the header of the frame includes the "frame type" field indicating the type of the frame, and therefore, the frame branching processing unit 21 can recognize the type of the received frame according to the value of the frame type field, and can perform the categorization of the received frame.

In addition, the decryption unit 5 has a hello frame decryption unit 25, a time synchronization frame decryption unit 26 and a data frame decryption unit 27 corresponding to the three frame types. While the decryption unit 5 is realized by the MPU 11 in this embodiment, it may also be realized by a dedicated hardware circuit.

The hello frame decryption unit 25 decrypts a hello frame stored in the hello frame reception buffer 22, and extracts and outputs an access key of another node apparatus that is not illustrated in FIG. 4. The time synchronization frame decryption unit 26 decrypts a time synchronization frame stored in the time synchronization frame reception buffer 23, and outputs information obtained by the decryption to the time synchronization unit 9. The data frame decryption unit 27 decrypts a data frame stored in the data frame reception buffer 24.

The node apparatus 1 further has an access key storage unit 28, as illustrated in FIG. 5, to store access keys (that is, externally-originated access keys) for other node apparatuses. The access key storage unit 28 stores an externally-originated access key included in a plaintext decrypted by the hello frame decryption unit 25. More specifically, the access key storage unit 28 stores externally-originated access keys respectively corresponding to a plurality of node apparatuses in association with information (for example, the node IDs, the MAC addresses or the like) identifying the plurality of node apparatuses.

Meanwhile, the access key storage unit 28 is realized by the DRAM 15 in FIG. 4 for example, and at least a part of it may be realized by a cache memory in the MPU 11.

In addition, the node apparatus 1 includes a confirmation unit 29 to confirm the authenticity of the decrypted data frame. While details of the operation of the confirmation unit 29 are described later with FIG. 16, the confirmation unit 29 is realized by the MPU 11 for example. Meanwhile, in the present embodiment, the confirmation unit 29 also performs confirmation of the authenticity of the decrypted access key.

In addition, the frame processing unit 6 includes a received data frame processing unit 30, and performs a process using a data frame that is confirmed as "authentic (that is, not tampered)" by the confirmation unit 29. For example, the received data frame processing 30 may perform a process to decide whether the same data frame as the one that has been already received is received again, or a new data frame is received. The received data frame processing unit 30 may also be realized by the MPU 11.

Meanwhile, in the decryption in the data frame decryption unit 27, the access key of the node apparatus 1 itself is used. To this end, the node apparatus 1 further has an access key storage unit 31 that stores the access key (that is, the internally-originated access key) for the node apparatus 1 itself. The access key storage unit 31 may be realized by DRAM 15 for example, and may also be realized by a cache memory in the MPU 11.

On the other hand, in the decryption in the hello frame decryption unit 25, the shared key that is the same for a plurality of node apparatuses in the network. To this end, the node apparatus 1 further has a shared key storage unit 32 to store the shared key. The shared key storage unit 32 may also be realized by the DRAM 15 for example, and may also be realized by a cache memory in the MPU 11.

In addition, the shared key stored in the shared key storage unit 32 is generated by the shared key generation unit 3, as described with respect to FIG. 3. That is, according to the present embodiment, a shared key that is determined uniquely by the time is generated by the shared key generation unit 3 in each of the plurality of node apparatuses according to the same algorithm so that there is no need to exchange the shared key between the plurality of node apparatuses.

Meanwhile, in order to avoid leaking of the shared key, the shared key generation unit 3 according to this embodiment is realized by the tamper-resistant PIC microcomputer 14 in FIG. 4. That is, the shared key generation unit 3 is tamper-resistant.

In addition, the shared key generation unit 3 uses time information to generate the shared key. Specifically, the node apparatus 1 has a clock 33, and the shared key generation unit 3 obtains the time information by referring to the clock 33.

While details are described later with FIG. 10, the node apparatus 1 further has a counter 34 realized by the timer IC 13 in FIG. 4. The counter 34 repeats a count-up operation, and when the value of the counter 34 reaches a predetermined value, the access key generation unit 2 generates an access key, and the counter 34 is cleared.

In addition, in the decryption in the time synchronization frame decryption unit 26, a fixed time synchronization key that is the same for a plurality of node apparatuses in the network and does not change according to time is used. To this end, the node apparatus 1 further has a time synchronization key storage unit 35 to store the time synchronization key.

The time synchronization key may be, for example, written in advance into a firmware program executed by the MPU 11 as a constant, and may be stored in the DRAM 15 by the firmware program being loaded onto the DRAM 15. The time synchronization key storage unit 35 may be realized by, for example, the flash memory 16, the DRAM 15 or a cache memory in the MPU 11.

Meanwhile, the frame processing unit 6 has not only the received data frame processing unit 30 to process a received data frame as described above, but also a hello frame creation unit 36 to create a hello frame. The hello frame creation unit 36 reads out the access key of the node apparatus 1 itself from the access key storage unit 31, and creates and outputs a plaintext frame to be the base of the hello frame. The hello frame creation unit 36 is realized by, for example, the MPU 11.

The plaintext frame output from the hello frame creation unit 36 is input to the encryption unit 4 and encrypted. Meanwhile, the encryption unit 4 has a hello frame encryption unit 37, a time synchronization frame encryption unit 38 and a data frame encryption unit 39, and each of these units in the encryption unit 4 is also realized by, for example, the MPU 11.

The hello frame encryption unit 37 encrypts the plaintext frame to be the base for the hello frame using the shared key stored in the shared key storage unit 32. In addition, the time synchronization frame encryption unit 38 encrypts a plaintext frame to be the base for the time synchronization frame using the time synchronization key stored in the time synchronization key storage unit 35. Furthermore, the data frame encryption unit 39 encrypts a plaintext frame to be the base for the data frame using the access key for the node apparatus being the destination of the data frame, among the access keys stored in the access key storage unit 28.

While details are described later with FIG. 20, the plaintext frame to be the base for the time synchronization frame is output from the time synchronization unit 9 to the time synchronization frame encryption unit 38.

In addition, the frame processing unit 6 further has a data frame creation unit 40 to create the plaintext frame to be the base of the data frame and output it to the data frame encryption unit 39.

Various frames encrypted in the encryption unit 4 are output to the transmission unit 7 and transmitted from the node apparatus 1. Specifically, the transmission unit 7 has three buffers (that is, a hello frame transmission buffer 41, a time synchronization frame transmission buffer 42 and a data frame transmission buffer 43) realized by the DRAM 15 in FIG. 4 for example, and further has a transmission processing unit 44. The transmission processing unit 44 may be realized by, for example, the wired PHY processing unit 12 and the MPU 11, or may be realized by the wireless LAN processing unit 17 and the MPU 11.

The hello frame transmission buffer 41 receives the encrypted hello frame from the hello frame encryption unit 37, stores it, and outputs it to the transmission processing unit 44. The time synchronization frame transmission buffer 42 receives the encrypted time synchronization frame from the time synchronization frame encryption unit 38, stores it, and outputs it to the transmission processing unit 44. The data frame transmission buffer 43 receives the encrypted data frame from the data frame encryption unit 39, stores it, and outputs it to the transmission processing unit 44. Then, the transmission processing unit 44 transmits the received frame.

Meanwhile, as illustrated in FIG. 5, the node apparatus 1 further has a latest transmission time storage unit 45 realized by the DRAM 15 for example, but explanation is omitted here since the latest transmission time storage unit 45 is to be described later with FIG. 16.

As the configuration of the node apparatus 1 has been described above with reference to FIG. 3-FIG. 5, the operation of the node apparatus 1 is described next with reference to FIG. 6-FIG. 21.

Figure 6:
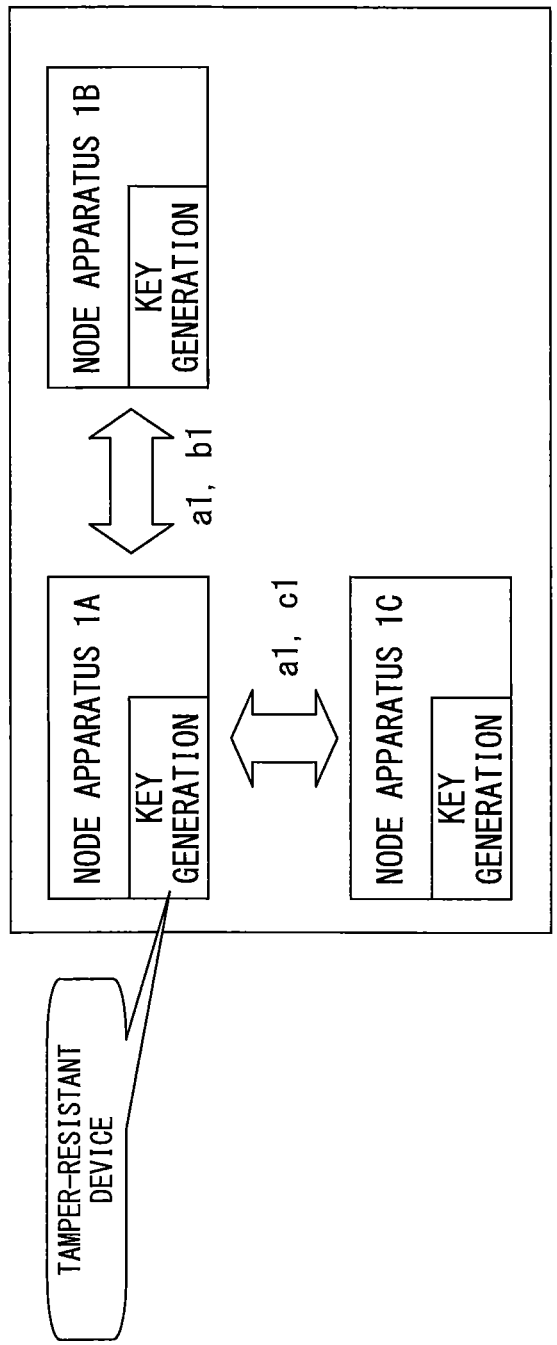
FIG. 6 is a diagram illustrating an authentication method by node apparatuses according to an embodiment.

FIG. 6 illustrates an authentication method by the node apparatuses 1 according to the present embodiment.

As illustrated in FIG. 6, when the node apparatus 1B and the node apparatus 1C exist in the surroundings of the node apparatus 1A, the node apparatus 1A exchanges a generated access key a1 with an access key b1 and an access key c1 of the node apparatus 1B and the node apparatus 1C, respectively. Then, the node apparatus 1A encrypts the data frame by the access key b1 and transmits it to the node apparatus 1B, and encrypts the data frame by the access key c1 and transmits it to the node apparatus 1C.

In the example of FIG. 6, for the node apparatus 1A, the access key a1 is an internally-originated access key, and the access keys b1 and c1 are externally-originated access keys. On the other hand, for the node apparatus 1B, the access key a1 is an externally-originated access key, and the access key b1 is an internally-originated access key.

The node apparatus 1A uses different access keys (b1 and c1) for the node apparatus 1B and the node apparatus 1C, respectively. In addition, for example, in the communication with the node apparatus 1B, the node apparatus 1A uses the access key b1 for data transmission, but uses the access key a1 for data reception. Thus, the node apparatus 1A conducts communication using different access keys for data transmission and data reception, respectively. In other words, the internally-originated access key is a key for decryption, and the externally-originated access key is a key for encryption.

Thus, each of the node apparatuses constituting the ad hoc communication network exchanges the access keys with adjacent node apparatuses according to the above-mentioned method, and encrypts a frame using the access key received from the communication partner node apparatus and transmits it. In addition, along with this, a frame received from the communication partner is decrypted using the access key that is updated periodically in the node apparatus itself. According to the above, security is ensured.

As described above, in the present embodiment, each node apparatus in the network generates an access key for the communication partner node apparatus to access the node apparatus itself, in performing communication with an adjacent node apparatus. Then, each node apparatus encrypts the above generated access key using the shared key that is the same within the network, and broadcasts the encrypted access key using a hello frame. Each node apparatus decrypts the access key included in the hello frame received from an adjacent node apparatus by the shared key, and accesses the adjacent node apparatus using the access key obtained by the decryption. Hereinafter, the process performed between two node apparatuses is specifically described.

Figure 7:
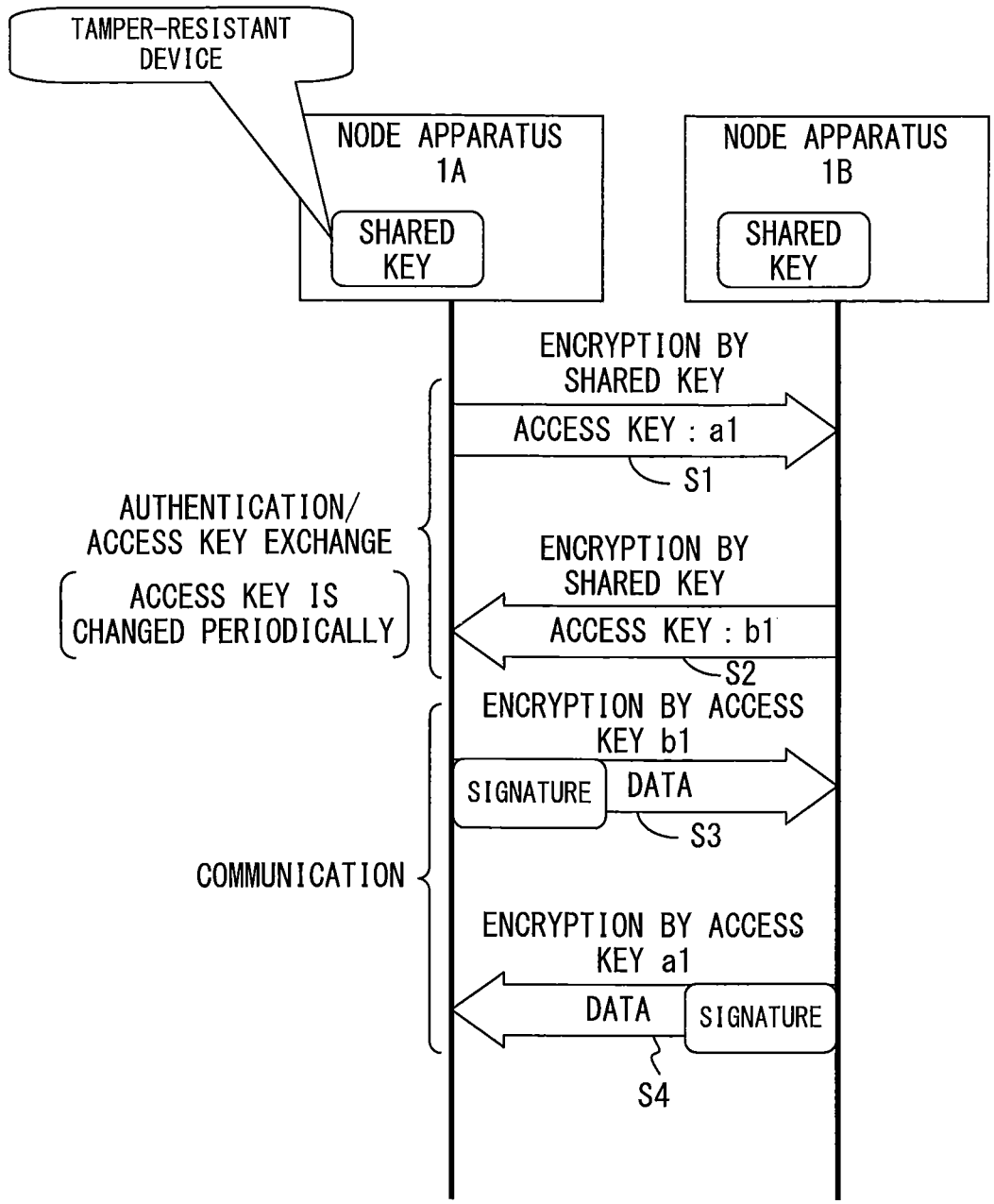
FIG. 7 is a sequence diagram illustrating a process to perform communication between two node apparatuses while authenticating the partner node apparatus with each other.

FIG. 7 is a sequence diagram illustrating a process to perform communication between two node apparatuses while authenticating partner node apparatus with each other. Here, in order to distinguish the two node apparatuses 1 from each other, they are referred to as a "node apparatus 1A" and a "node apparatus 1B".

First, in step S1, an access key a1 generated in the node apparatus 1A is transmitted from the node apparatus 1A to the node apparatus 1B being the communication partner node apparatus. The access key a1 is, as described above, encrypted by a shared key that is held as the same between the node apparatus 1A and the node apparatus 1B. The node apparatus 1B performs a decryption process using the shared key generated by the node apparatus 1B itself using a tamper-resistant device, and obtains the access key a1.

Next, in step S2, an access key b1 generated in the node apparatus 1B is transmitted from the node apparatus 1B to the node apparatus 1A being the communication partner node apparatus. The access key b1 is also encrypted by the shared key that is the same for the node apparatus 1A and the node apparatus 1B. The node apparatus 1A performs a decryption process using the shared key generated in the node apparatus 1A itself using a tamper-resistant device, and obtains the access key b1.

In the processes in step S1 and step S2, if one of node apparatuses is a third party attempting a fraudulent access, it does not have the share key that is the same with the communication partner node apparatus, and cannot obtain the access key of the communication partner node apparatus by decryption. By utilizing this fact, when the exchange of access keys between the two node apparatuses 1A and 1B is successful, it can be judged that the communication partner node apparatuses 1A and 1B are authentic. That is, when the exchange of access keys between the node apparatuses 1A and 1B is successful, the node apparatus 1A can judge the node apparatus 1B as authentic, and the node apparatus 1B can judge the node apparatus 1A as authentic.

In the present embodiment, the authentication of the communication partner node apparatus is performed according to the success/failure of the exchange of the access keys with the communication partner node apparatus, and when the authentication is successful, communication in and after step S3 is started.

Meanwhile, the authentication processes in step S1 and step S2 are performed every time when the access key is updated.

In step 3, a frame including data is transmitted from the node apparatus 1A to the node apparatus 1B. The transmitted frame is encrypted by the access key b1 obtained by the node apparatus 1A in step S2. For example, as explained with regard to FIG. 2, the sensor data frame being an encrypted frame including sensor data is transmitted in step S3.

In addition, the frame has a signature. The signature is described later. Upon receiving the frame, the node apparatus 1B performs decryption of the received frame using the access key b1 generated in the node apparatus 1B itself and obtains the data.

In step S4, a frame including data is transmitted from the node apparatus 1B to the node apparatus 1A. The transmitted frame is encrypted by the access key a1 obtained by the node apparatus 1B in step S1, and has a signature. Upon receiving the frame, the node apparatus 1A performs decryption of the received frame using the access key a1 generated in the node apparatus 1A itself and obtains the data.

As illustrated in FIG. 7, the node apparatuses 1 (1A and 1B) according to the present embodiment encrypt the access keys (a1 and b1), which are generated in the respective node apparatuses (1A and 1B), using the shared key that is the same for the communication partner node apparatuses (1B and 1A), and exchange them. When the communication partner node apparatuses (1B and 1A) are authentic, the communication partner node apparatuses (1B and 1A) have the shared key that is the same for the node apparatuses themselves (1A and 1B).

For this reason, the respective node apparatuses (1A and 1B) are able to decrypt the access keys (b1 and a1) received from the communication partner node apparatuses (1B and 1A) using the shared key held in the node apparatuses themselves (1A and 1B). Since a third party attempting a fraudulent access does not hold the above shared key, the respective node apparatuses (1A and 1B) can judge whether the communication partner node apparatuses (1B and 1A) are authentic or fraudulent, according to whether or not the received access keys (b1 and a1) can be decrypted. Each node apparatus 1 periodically exchanges the access keys with the communication partner node apparatus, and continues communication with the node apparatus that is successfully judged to be authentic.

In addition, at the time of data reception, a decryption process is performed using the access key generated in the node apparatus itself, to take out data. For example, in step S3, the node apparatus 1B at the receiving side performs a decryption process using the access key b1 generated by the node apparatus 1B itself.

At the time of data transmission, data is transmitted while encrypted using the access key that was generated in the communication partner node apparatus and was received from the communication partner node apparatus in the authentication process. For example, in step S3, the node apparatus 1A on the transmission side performs an encryption process using the access key b1 received from the communication partner node apparatus 1B in step S2.

FIG. 8 is a diagram which illustrates a format of a data frame. Further details of the format are described later with FIG. 15 and FIG. 17. In addition, an example of a format of a hello frame is described later with FIG. 12.

As illustrated in FIG. 8, the data frame is formed by a header, frame identification information (FID), time information and a body, and a signature is added to the data frame.

The header stores destination information of the frame, for example. The FID stores a sequence number and the like that is for identifying the data frame and that is provided by the node apparatus 1 at the source. The time information stores information indicating the time at which the frame illustrated in FIG. 8 is composed. Specifically, information indicating the time at which the data frame illustrated in FIG. 8 is forwarded to an adjacent node apparatus is stored. The body stores the main body of the data.

The signature stores a value obtained by encrypting the hash code of the frame (to be exact, the plaintext frame) itself by the shared key. The signature verifies that the frame illustrated in FIG. 8 is the one generated by a node apparatus holding the same shared key.

The data frame illustrated in FIG. 8 is transmitted while encrypted by the access key of the communication partner node apparatus (that is, by the externally-originated access key).

Upon receiving an encrypted frame from the communication partner node apparatus, the node apparatus 1 according to the present embodiment decrypts it using the access key generated by the node apparatus itself and obtains a plaintext frame. The node apparatus 1 further takes out the encrypted hash value attached as the signature from the plaintext frame, and further, decrypts the taken-out hash value (encrypted hash value) using the shared key. Then, the value obtained by the decryption using the shared key and the hash value calculated from the plaintext frame are compared, and when they match each other, the node apparatus 1 decides that "a frame generated in a node apparatus holding the same shared key as that for the node apparatus itself is received".

In addition, the node apparatus 1 according to the present embodiment stores the combination of the FID and the time information of the data frame received from the partner, and compares the stored FID and time information with the FID and time information of a received data frame. For example, when communication is conducted between two node apparatuses that are authenticated by each other, a fraudulent node apparatus may capture, copy and transmit the data frame. In that case, the FID and time information included in the data frame corresponds to the FID and time information received previously from an authentic node apparatus. When the FID and time information of a received data frame correspond to the FID and time information stored in the node apparatus 1 itself as described above, the node apparatus 1 judges that an access from a fraudulent node apparatus is made, and discards the received data frame.

Meanwhile, when a data frame is resent by an authentic node apparatus, the FID corresponds to the stored FID, but the time information is different. For a data frame "whose FID corresponds to a stored value while whose time information is different" as described above, the node apparatus 1 judges it as the same as a previously-received data frame, and discards the data frame as well.

Next, the series of processes described with reference to FIG. 6-FIG. 8 above are explained in greater detail with reference to flowcharts in FIG. 9-FIG. 16.

Figure 9:
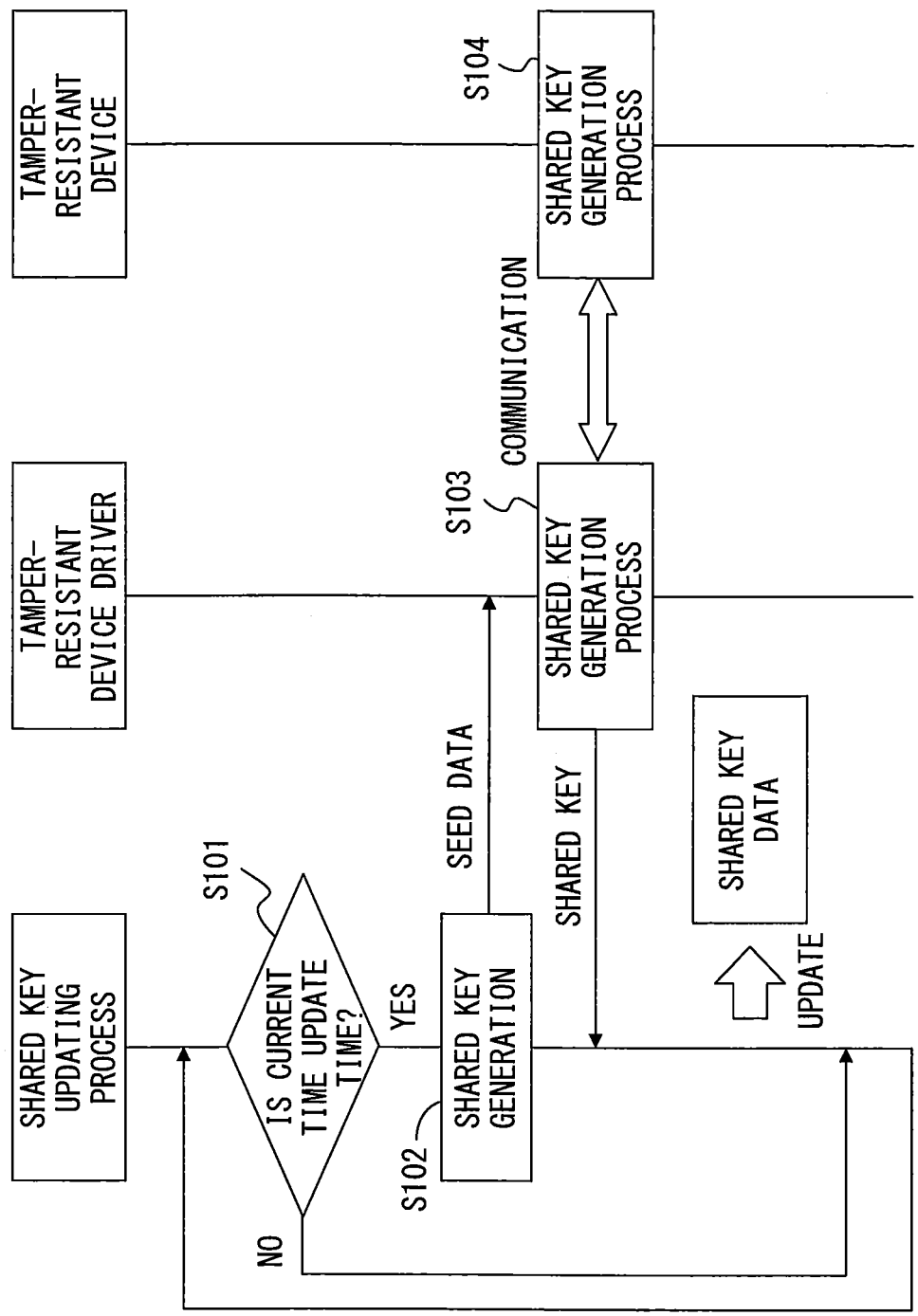
FIG. 9 is a flowchart of a shared key updating process.

FIG. 9 is a flowchart of a shared key updating process. The shared key updating process starts when the power of the node apparatus 1 is turned on.

In step S101, the MPU 11 in FIG. 4 controlling the entirety of the node apparatus 1 refers to the clock 33 in FIG. 5 to recognize the current time, and judges whether or not the current time is a predetermined update time. Meanwhile, here, the "update time" is a time predetermined as the time to perform the update of the shared key. For example, when $t_2=12$ (hours), it may be determined as "1:00 and 13:00 of each day are the update times".

If the current time is the update time, the process proceeds to step S102, and the MPU 11 instructs the driver (hereinafter, referred to as a "tamper-resistant device driver") of the tamper-resistant PIC microcomputer 14 to start the process to generate the shared key. The tamper-resistant device driver operates as a part of the shared key generation unit 3.

In other words, the MPU 11 gives data (hereinafter, referred to as "seed data") to be used as a seed to generate the shared key to the tamper-resistant device driver as an argument. The tamper-resistant device driver is also a kind of programs executed by the MPU 11.

Next, in step S103, the tamper-resistant device driver outputs the received seed data to the tamper-resistant PIC microcomputer 14 being a tamper-resistant device, and instructs the tamper-resistant PIC microcomputer 14 to generate a new shared key using the seed data.

Then, in step S104, the tamper-resistant PIC microcomputer 14 generates a new shared key using the received seed data, and notifies the tamper-resistant device driver of the generated shared key. The tamper-resistant device driver stores the generated new shared key in the shared key storage unit 32 realized on the DRAM 15 for example.

As described above, if the current time is the update time, the shared key is updated. On the other hand, if the current time is not the update time, the process returns to step S101. Meanwhile, the branching in step S101 may be realized by timer interrupt.

Next, update of the access key is described with reference to FIG. 10. As explained with regard to FIG. 7, the access key is updated periodically.

Figure 10:
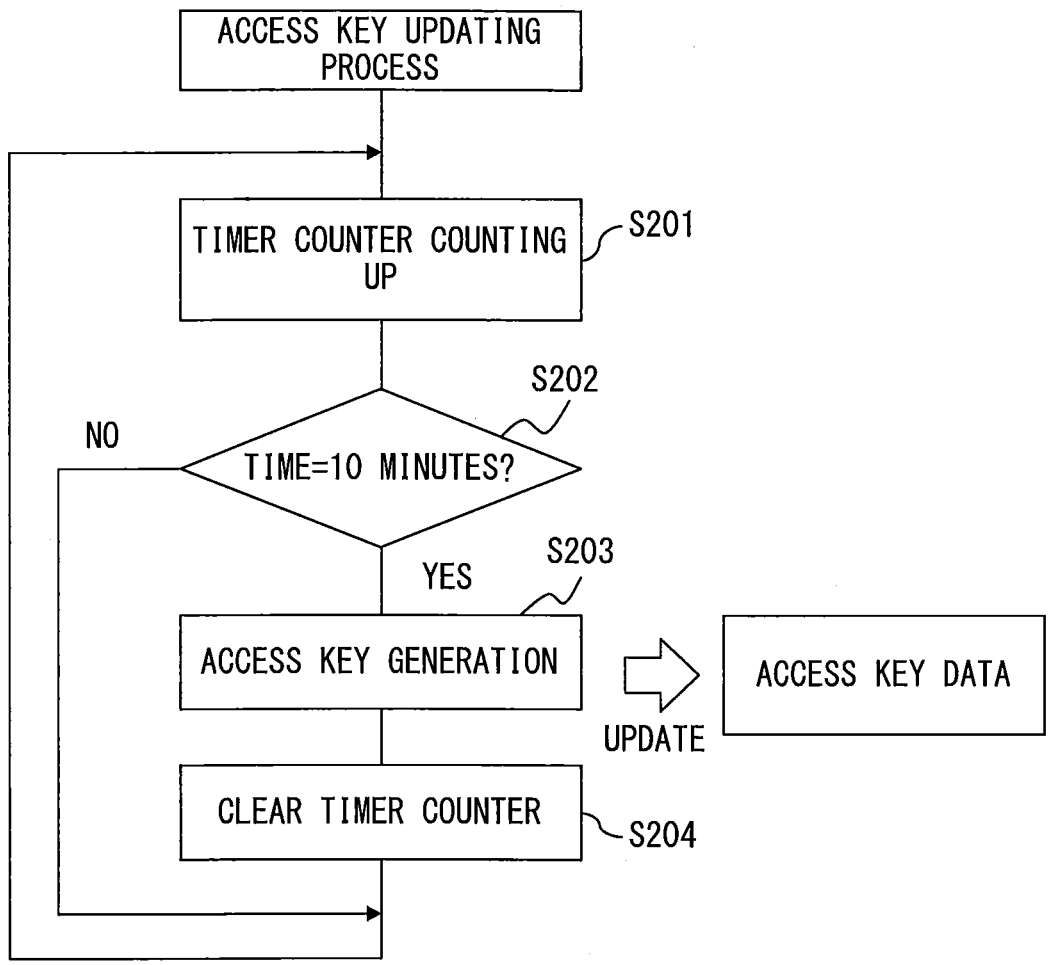
FIG. 10 is a flowchart of an access key updating process.

FIG. 10 is a flowchart of an access key updating process.

In step S201, a time counter (that is, the counter 34 in FIG. 5 realized by the timer IC 13 in FIG. 4) within the node apparatus 1 performs a counting-up operation.

Then, in step S202, the access key generation unit 2 judges whether or not the predetermined time $t_1$=10 minutes have passed, referring to the value of the counter 34. If the predetermined time $t_1$=10 minutes have passed (that is, if the value of the counter 34 has reached a predetermined value as a value corresponding to $t_1$=10 minutes), the process proceeds to step S203, and if the predetermined time $t_1$=10 minutes have not passed, the process returns to S201.

In step S203, the access key generation unit 2 generates a new access key according to a predetermined algorithm and overwrite and update the internally-originated access key stored in the access key storage unit 31.

In addition, in step S204, the clearing operation of the time counter (that is, the counter 34 in FIG. 5) is performed, and after that, the process returns to step S201.

Meanwhile, the shared key updating process in FIG. 9 may also be realized using a second counter (i.e., a different counter than the counter 34 in FIG. 5) that is not illustrated in the drawing and that is cleared when the count value reaches a value corresponding to a predetermined time $t_2$. On the contrary, the access key updating process in FIG. 10 may also be realized by the access key generation unit 2 referring to the clock 33 and judging whether or not the current time corresponds to the update time for the access key.

Incidentally, in the ad hoc communication system including a number of node apparatuses 1, it is preferable that the traffic is distributed in terms of time for the ad hoc communication system as a whole. The transmissions of the hello frames accompanying the updates of the access keys may be distributed in terms of time within the ad hoc communication system by (1)-(3) below, for example.

(1) In a case in which the respective node apparatuses 1A-1I in FIG. 2 are set to start the process in FIG. 10 when the same predetermined time passes after the power is turned on, the power of the respective node apparatuses 1A-1I is turned on at different times. Accordingly, the update times of the access keys by the respective node apparatuses 1A-1I are also distributed, so the transmissions of the hello frames that occur following the updates of the access keys occur distributedly in terms of time.

(2) The respective node apparatuses 1A-1I may be set to start the process in FIG. 10 when a random time that is different for the respective node apparatuses 1A-1I passes after the power is turned on. For example, the above-mentioned random time may be written and set in a predetermined area of the flash memory 16 of each of the node apparatuses 1A-1I in advance.

(3) The respective node apparatuses 1A-1I may be set so that the length of the above-mentioned predetermined time $t_1$ is different thereamong. The predetermined time $t_1$ is, for example, set in advance as a constant used in the firmware program executed by the MPU 11.

Meanwhile, when the access key is generated as described above by the process in FIG. 10, a hello frame is transmitted as described with regard to steps S1 and S2 in FIG. 7. The hello frame notifies adjacent node apparatuses of the generated new access key.

Then, hereinafter, details of the transmission and reception of the hello frame are described with reference to FIG. 11-FIG. 13.

Figure 11:
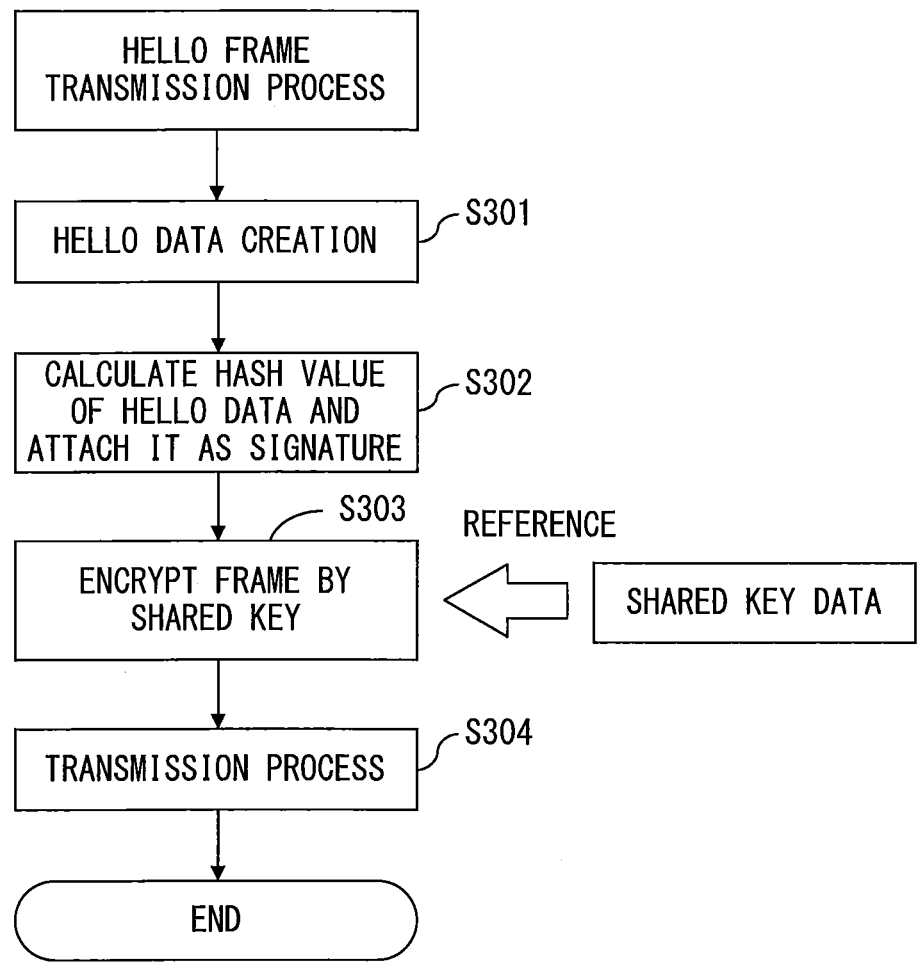
FIG. 11 is a flowchart of a hello frame transmission process.

FIG. 11 is a flowchart of a hello frame transmission process. In addition, FIG. 12 is a diagram which illustrates a format of the hello frame and various processes performed with regard to the hello frame.

Triggered by the generation of an access key by the access key generation unit 2, the process in FIG. 11 is started. For example, in step S1 in FIG. 7, the node apparatus 1A, and in step S2, the node apparatus 1B, perform the process in FIG. 11. For example, the hello frame creation unit 36 starts the process in FIG. 11 by the notification of the generation of an access key by the access key generation unit 2 to the hello frame creation unit 36.

In step S301, the hello frame creation unit 36 creates hello data (that is, plaintext data to be the base of the payload of the hello frame) and the header of the hello frame. Specifically, the hello data includes data of an access key that the access key generation unit 2 newly generated.

For example, the hello frame may be arbitrary as long as it is a frame in a predetermined format for the exchange of access keys, and its payload may include various fields other than the access key. However, hereinafter, to simplify the explanation, description is made with an example of a case in which the hello frame according to the present embodiment includes only an encrypted access key in its payload.

In this case, in step S301, the hello frame creation unit 36 can prepare the hello data simply by reading out the internally-originated access key as the hello data from the access key storage unit 31. That is, a plaintext access key D1 in FIG. 12 is prepared as the hello data in step S301.

Next, in step S302, the hello frame creation unit 36 calculates the hash value of the hello data, and attaches the calculated hash value to the end of the plaintext frame to be the base of the hello frame as a signature. Specifically, the hello frame creation unit 36 calculates a plaintext hash value D2 from the plaintext access key D1 in FIG. 12, and outputs a plaintext frame in which the header, the plaintext access key D1 and the plaintext hash value D2 are concatenated to the hello frame encryption unit 37. Meanwhile, the name "plaintext hash value" is a name to clarify that it is an original hash value before encryption, in contract to an encrypted hash value.

Then, in step S303, the hello frame encryption unit 37 refers to the shared key storage unit 32, reads out the shared key, and encrypts the plaintext frame (to be exact, the payload and trailer of the plaintext frame), which has undergone the attachment of the signature in step S302, using the shared key.

For example in the present embodiment, RC4 being a type of stream ciphers is adopted as the encryption algorithm. Therefore, in step S303, the hello frame encryption unit 37 generates a key stream from the shared key, and obtains the exclusive disjunction (XOR; eXclusive OR) of a part formed by the plaintext access key D1 and the plaintext hash value D2, and the key stream. By this, in step S303, the encrypted payload and trailer are generated.

Figure 12:
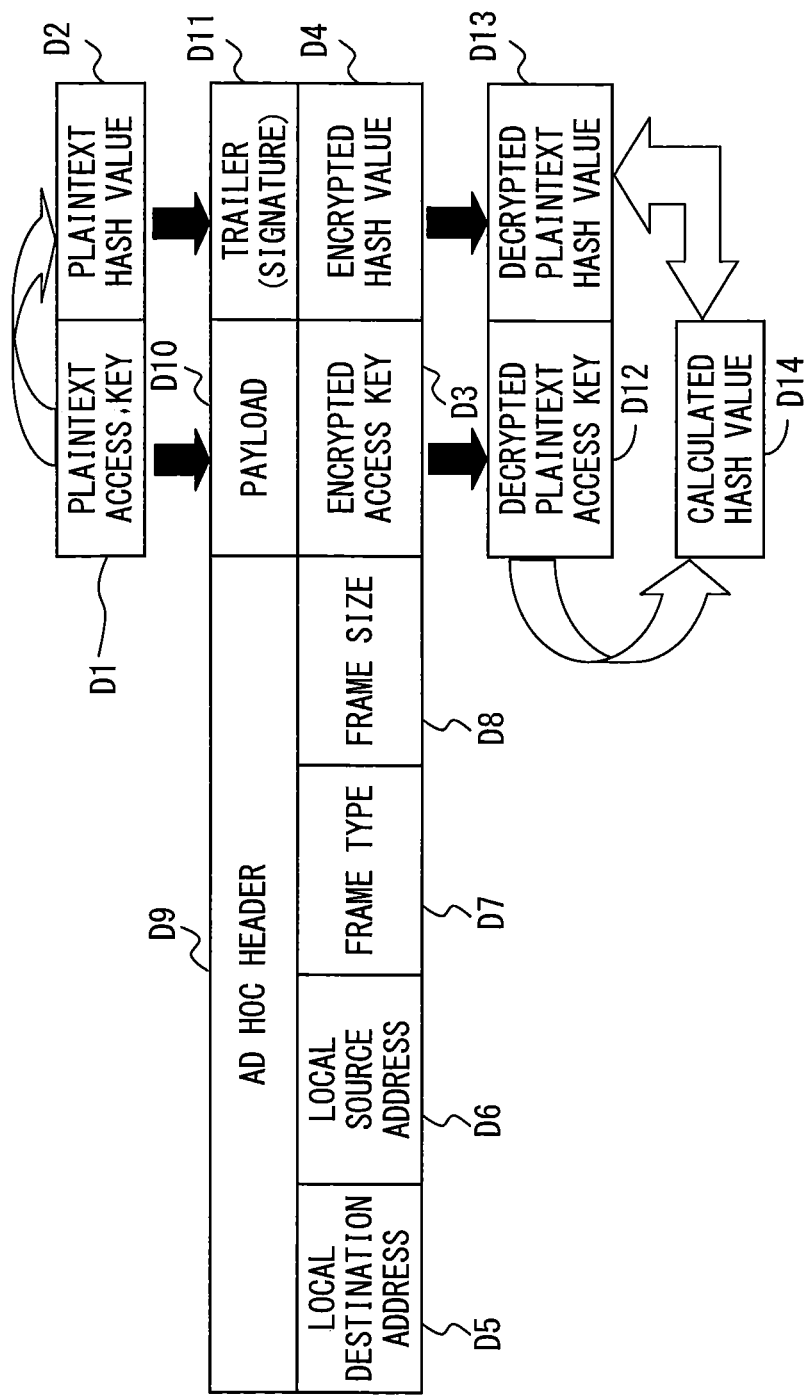
FIG. 12 is a diagram illustrating a format of a hello frame and various processes performed regarding the hello frame.

Specifically, as illustrated in FIG. 12, the hello frame encryption unit 37 generates an encrypted access key D3 from the plaintext access key D1, and generates an encrypted hash value D4 from the plaintext hash value D2. Meanwhile, in FIG. 12, the encryption or decryption operation using the shared key is indicated with a bold black arrow.

In addition, the header prepared in step S301 is not encrypted, and used unchanged as a cleartext. In this embodiment, as illustrated in FIG. 12 for example, an ad hoc header D9 including respective fields of a local destination address D5, a local source address D6, a frame type D7 and a frame size D8 is prepared in step S301.

Therefore, in step S303, the hello frame encryption unit 37 concatenates the encrypted access key D3 as a payload D10 and the encrypted hash value D4 as a trailer D11 to the ad hoc header D9, to generate a hello frame. Then, the hello frame encryption unit 37 outputs the generated hello frame to the hello frame transmission buffer 41.

Meanwhile, in this embodiment, the hello frame is broadcasted in order to notify a plurality of adjacent apparatuses (other node apparatuses and/or the gateway apparatus GW) of the access key. To this end, specifically, the local destination address D5 is a broadcast address, and the local source address D6 is the MAC address of the node apparatus 1 itself.

In addition, the frame type D7 is set to a value that indicates the hello frame. In the frame size D8, the sum of the lengths of the encrypted access key D3 and the encrypted hash value D4 (that is, the sum of the lengths of the plaintext access key D1 and the plaintext hash value D2) is specified.

Finally, in step S304, the transmission unit 7 transmits the hello frame. That is, the hello frame stored temporarily in the hello frame transmission buffer 41 as a result of step S303 is read out and transmitted by the transmission processing unit 44 in step 304.

Figure 13:
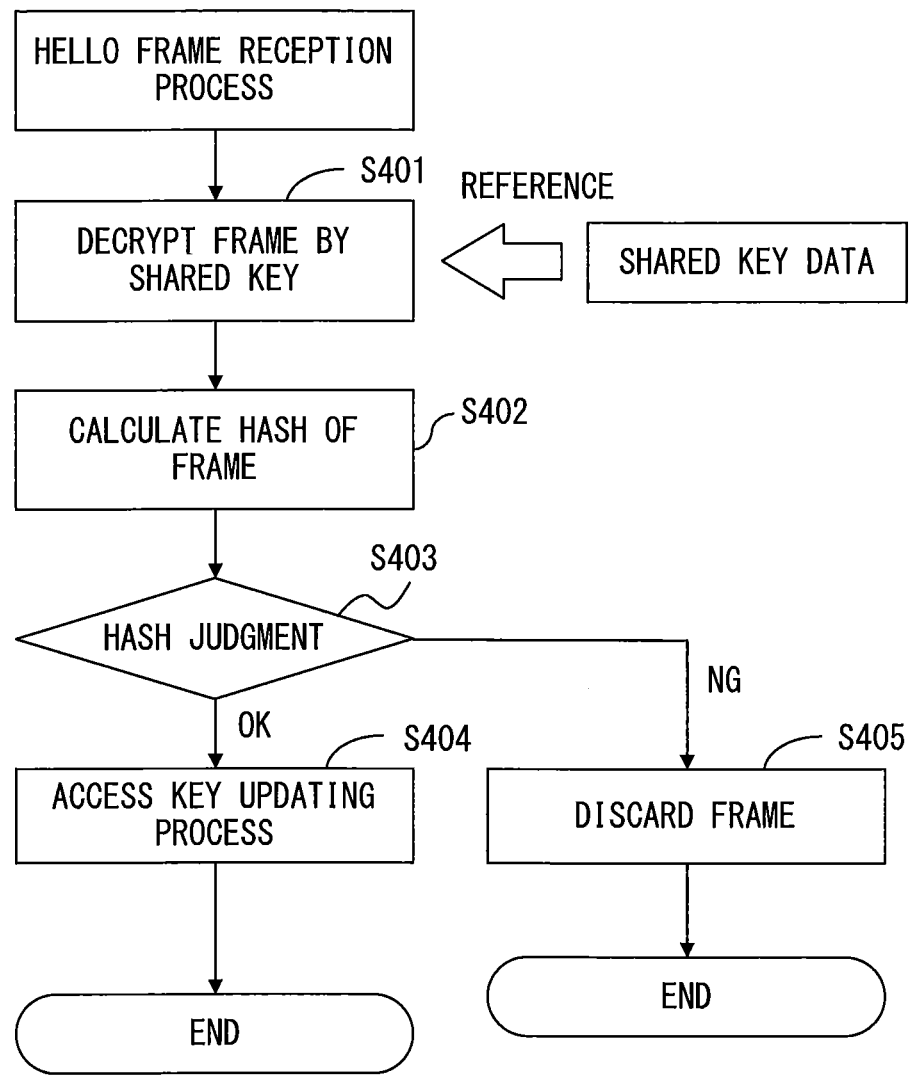
FIG. 13 is a flowchart of a hello frame reception process.

FIG. 13 is a flowchart of a hello frame reception process. For example, in step S1 in FIG. 7, since the node apparatus 1A in FIG. 2 performs the process in FIG. 11, the node apparatus 1B adjacent to the node apparatus 1A performs the process in FIG. 13.

When the reception unit 8 receives a hello frame in the node apparatus 1B, the frame branching processing unit 21 judges that "the received frame is a hello frame" according to the frame type D7 of the ad hoc header D9. Then, triggered by the judgment, the process in FIG. 13 is started. In addition, the received frame judged to be a hello frame by the frame branching processing unit 21 is stored temporarily in the hello frame reception buffer 22.

In step S401, the hello frame decryption unit 25 in the decryption unit 5 refers to the shared key storage unit 32 and reads out the data of the shared key. Then, using the shared key, the hello frame decryption unit 25 decrypts the hello frame (to be exact, in this embodiment, its payload and trailer) stored in the hello frame reception buffer 22.

In other words, the hello frame decryption unit 25 generates a key stream from the shared key, and obtains the XOR of the part formed by the payload D10 and the trailer D11, and the key stream. By this, the hello frame decryption unit 25 obtains the decrypted plaintext access key D12 from the encrypted access key D3, and obtains the decrypted plaintext hash value D13 from the encrypted hash value D4. Then, the hello frame decryption unit 25 outputs a plaintext frame formed by the ad hoc header D9, the decrypted plaintext access key D12 and the decrypted plaintext hash value D13 to the confirmation unit 29.

Then, in step S402, the confirmation unit 29 extracts the decrypted plaintext access key D12 from the plaintext frame input from the hello frame decryption unit 25. Then, the confirmation unit 29 calculates the hash value of the decrypted plaintext access key D12, and obtains a calculated hash value D14 in FIG. 12.

Then, in step S403, the confirmation unit 29 compares the decrypted plaintext hash value D13 and the calculated hash value D14 in FIG. 12.

If the two hash values are equal, the confirmation unit 29 judges as "OK", and the process shifts to step S404. On the other hand, if the two hash values are different, the confirmation unit 29 judges as "NG", and the process shifts to the step S405.

In step S404, the confirmation unit 29 overwrites the externally-originated access key associated with the local source address D6 in the access key storage unit 28 with the decrypted plaintext access key D12. As a result, the externally-originated access key corresponding to the source node apparatus of the hello frame is updated. Then, the process in FIG. 13 is terminated.

On the other hand, in step S405, the hello frame that has triggered off the start of the process in FIG. 13 is discarded, and the process in FIG. 13 is terminated.

The details of the processes corresponding to steps S1 and S2 in FIG. 7 have been described above with reference to FIG. 10-FIG. 13. Next, details of the processes corresponding to steps S3 and S4 in FIG. 7 are described with reference to FIG. 14-FIG. 16.

Figure 14:
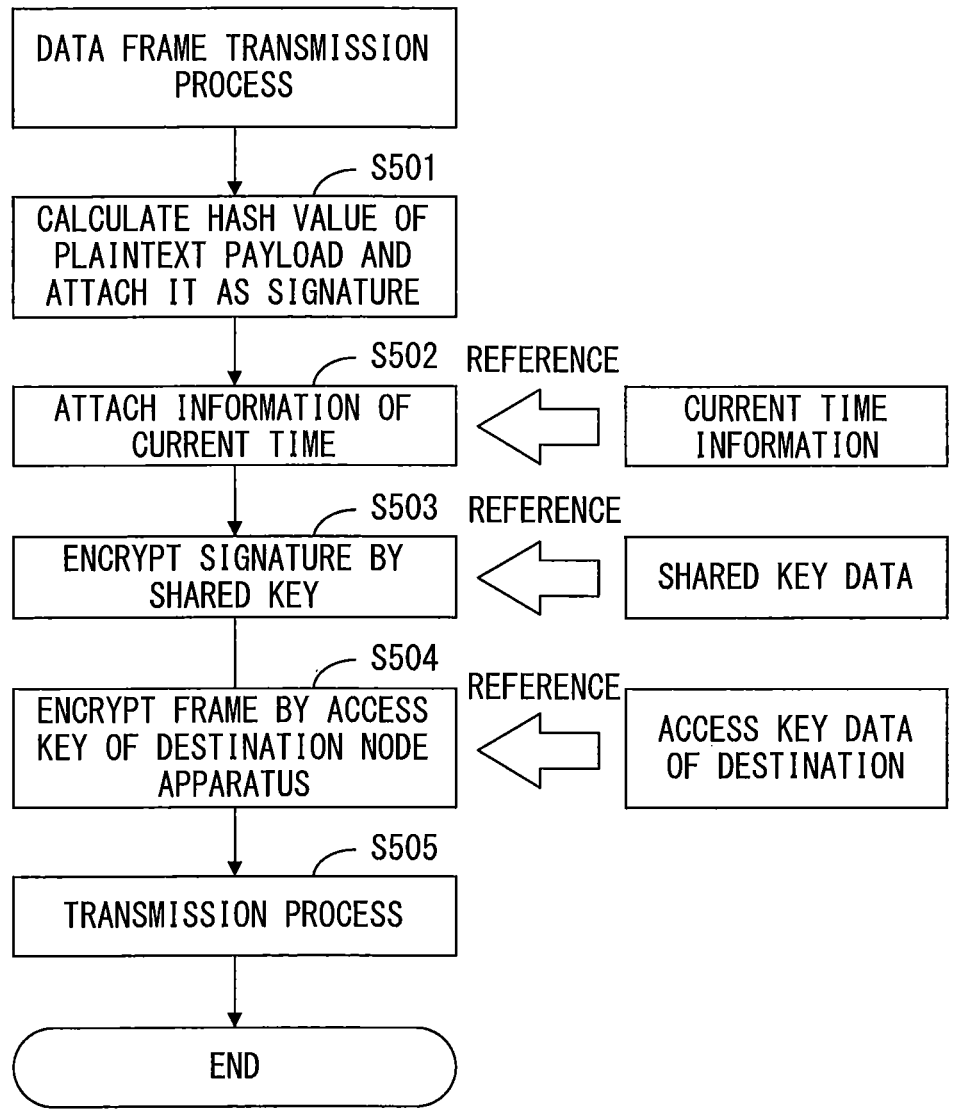
FIG. 14 is a flowchart of a data frame transmission process.

FIG. 14 is a flowchart of a data frame transmission process. In step S3 in FIG. 7, the node apparatus 1A, and in step S4, the node apparatus 1B perform the process in FIG. 14. According to embodiments, the data frame transmission process may be started, triggered by, for example, input from an external device such as a sensor connected to the node apparatus 1. Alternatively, the node apparatus 1 may perform the data frame transmission process according to a predetermined schedule.

In the present embodiment, when the following conditions (1)-(3) hold, the data frame creation unit 40 starts the process in FIG. 14.

(1) Transmission target data (hereinafter, referred to as "target data") is prepared. The target data may be, for example, input by an external device connected to the node apparatus 1 or may be generated by the data frame creation unit 40. The example of the target data is the sensor data described with regard to FIG. 2.

(2) The final destination (that is, the global destination within the ad hoc network) is determined. The final destination may be determined fixedly to be the gateway apparatus GW as in the example in FIG. 2, or may be determined dynamically by the data frame creation unit 40.

(3) A local destination (that is, one of adjacent other node apparatuses) is determined from the global destination. The node apparatus 1 being a constituent element of the ad hoc communication system can determine a local destination from the global destination Meanwhile, (3) above is supplemented as follows.

As described with regard to FIG. 1, the node apparatus 1 being a constituent element of the ad hoc communication system can create a list of other node apparatuses existing in the surroundings of the node apparatus 1 itself, and can determine a node apparatus to which the node apparatus 1 forwards the frame, according to the list. That is, a function to route a frame by determining a local destination from the global destination is implemented in the node apparatus 1.

For example, the node apparatus 1B in FIG. 2 creates a list of other node apparatus 1A, 1C and 1E existing in the surroundings of the node apparatus 1B itself, and manages information such as that "it is preferable to forward a frame whose final destination is the gateway apparatus GW to the node apparatus 1C". That is, the node apparatus 1B manages the global destination (for example, the gateway apparatus GW) while associating it with a local destination (for example, the node apparatus 1C) indicating an apparatus adjacent to the node apparatus 1B itself, and routes a frame. Information associating the global destination and a local destination is stored in the DRAM 15 in FIG. 4 for example.

In addition, the information associating the global destination and a local destination may be weighted. Regarding a certain global address (for example, the gateway apparatus GW), the weighting indicates which of a plurality of apparatuses (for example, the node apparatus 1A, 1C and 1E) adjacent to the node apparatus 1B itself is preferable as the forwarding destination. For example, in the example of FIG. 2, the weight for the pair of the gateway apparatus GW and the node apparatus 1C indicates higher preference than the weight for the pair of the gateway apparatus GW and the node apparatus 1A. In other words, the weighting indicates information such as that "it is more preferable to forward a frame whose final destination is the gateway apparatus GW to the node apparatus 1C rather than to the node apparatus 1A or 1E".

By executing a firmware program, the MPU 11 manages the information described above and determines whether or not a received frame needs to be forwarded. When the forwarding is needed, the MPU 11 executing the firmware program refers to the DRAM 15 to determine a local destination from the global destination, and transmits the frame while setting its forwarding destination to be the determined local destination.

Here, returning to the explanation of FIG. 14, the data frame transmission process starts when the conditions (1)-(3) described above hold, as described above.

Then, in step S501, the data frame creation unit 40 calculates the hash value of the plaintext payload to be the base of the payload of the data frame. The data frame creation unit 40 attaches the calculated hash value as a part of the plaintext trailer following the end of the plaintext payload. In the present embodiment, a signature is set in the trailer.

Here, step S501 is described in greater detail below with reference to FIG. 15.

Figure 15:
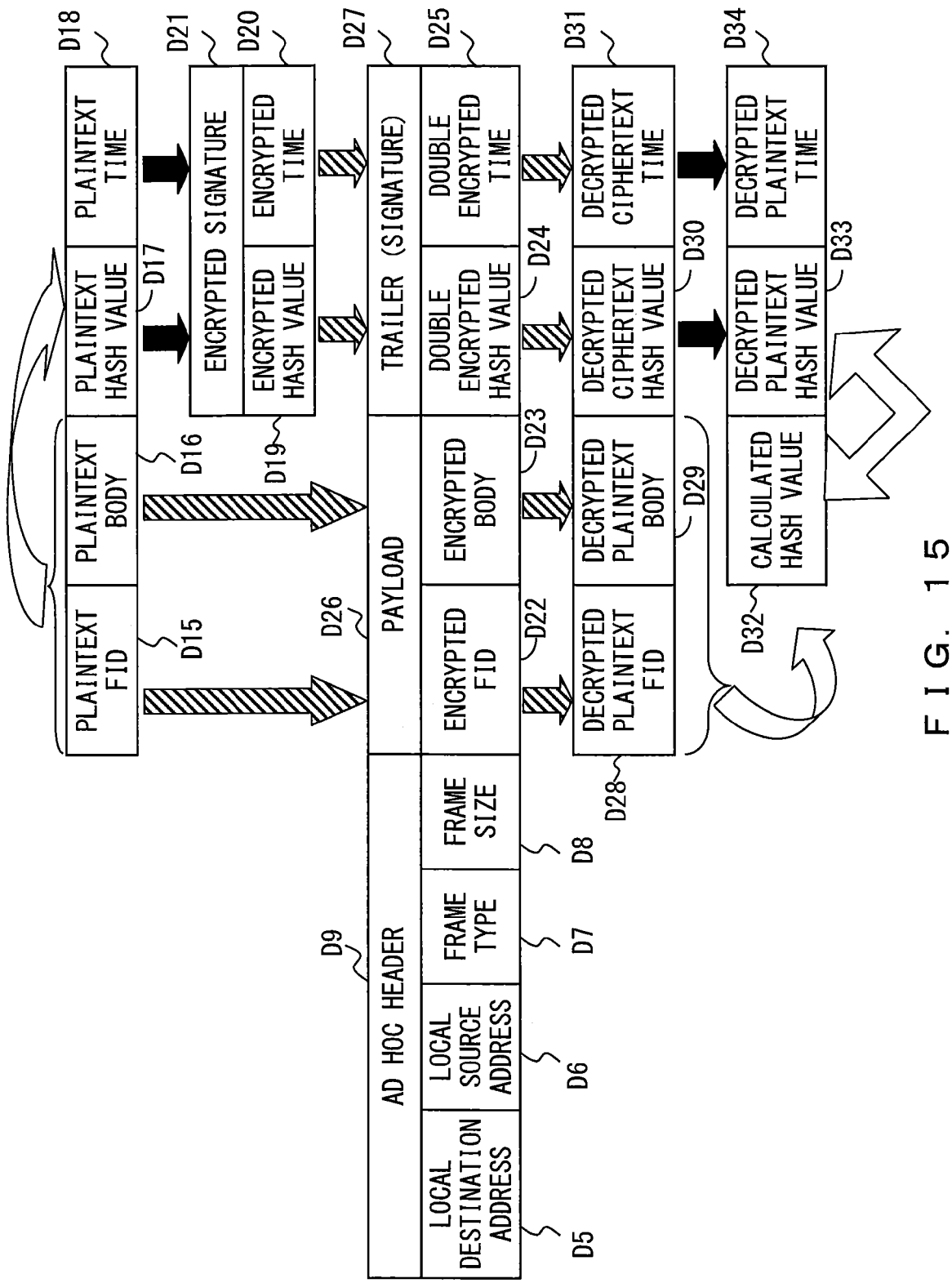
FIG. 15 is a diagram illustrating a first example of a format of a data frame and various processes performed regarding the data frame.

FIG. 15 is a diagram which illustrates the first example of a format of the data frame and various processes performed with regard to the data frame. FIG. 15 is a description of a case in which a partly different format than that in FIG. 8 is adopted. The case in which the same format as in FIG. 8 is adopted is described later with FIG. 17.

In step S501, the data frame creation unit 40 issues a new FID as a plaintext FID D15 in FIG. 15. In addition, the data frame creation unit 40 prepares not only the target data explained above with regard to the condition (1) but also other data to be included in the payload as needed in step S501. The data prepared in step S501 may be data readout from the DRAM 15 or a flash memory 16, or may be data generated by the data frame creation unit 40, or may be data input from an external device.

For example, the data frame creation unit 40 creates a plaintext body D16 by combining data specifying the global destination being the final destination of the data frame with the target data prepared in the condition (1).

In addition, while not explicitly illustrated in FIG. 14, the data frame creation unit 40 further generates the ad hoc header D9 in step S501. The format of the ad hoc header D9 is the same as that for the hello frame.

That is, also in the data frame, the ad hoc header D9 includes the local destination address D5, the local source address D6, the frame type D7 and the frame size D8. However, the local destination address D5 is the MAC address determined as described above for the condition (3). In addition, the frame type D7 is set to a value indicating the data frame.

Thus, in step S501, the data frame creation unit 40 creates the ad hoc header D9 and the plaintext payload formed by the plaintext FID D15 and the plaintext body D16, and calculates the plaintext hash value D17 in FIG. 15 from the plaintext payload.

In addition, in step S502, the data frame creation unit 40 refers to the clock 33 to obtain the current time information, and concatenates the obtained current time information to the end of the plaintext hash value D17 as a plaintext time D18 in FIG. 15. A part formed by the plaintext hash value D17 and the plaintext time D18 is a plaintext signature to be the base of an encrypted signature. Then, the data frame creation unit 40 outputs a plaintext frame formed by the ad hoc header D9, the plaintext payload and the plaintext signature to the data frame encryption unit 39.

Then, in step S503, the data frame encryption unit 39 refers to the shared key storage unit 32 to read out the shared key, and obtains an encrypted signature D21 by encrypting the plaintext signature using the shared key.

As described above, in the present embodiment, RC4 is adopted as the encryption algorithm. Therefore, in step S503, specifically, the data frame encryption unit 39 generates a key stream from the shared key, and obtains the XOR of the plaintext signature and the key stream.

As a result, an encrypted hash value D19 is obtained from the plaintext hash value D17, and an encrypted time D20 is obtained from the plaintext time D18. In other words, from the plaintext signature as a whole, the encrypted signature D21 formed by the encrypted hash value 19 and the encrypted time D20 is obtained.

Next, in step S504, the data frame encryption unit 39 encrypts the plaintext frame using the access key of the node apparatus being the transmission destination determined in the condition (3) above (that is, the node apparatus whose MAC address is specified in the local destination address D5). That is, the data frame encryption unit 39 refers to the access key storage unit 28 to read out the access key of the node apparatus of the transmission destination, and encrypts the plaintext payload and the encrypted signature D21 using the read-out access key.

That is, the data frame encryption unit 39 performs the generation of the key stream and the XOR operation. As a result, the data frame encryption unit 39 generates an encrypted FID D22 from the plaintext FID D15 and an encrypted body D23 from the plaintext body D16, respectively. In addition, the data frame encryption unit 39 generates a double encrypted hash value D24 from the encrypted hash value D19 and a double encrypted time D25 from the encrypted time D20. That is, from the encrypted signature D21, a double-encrypted signature corresponding to the trailer is obtained.

Figure 17:
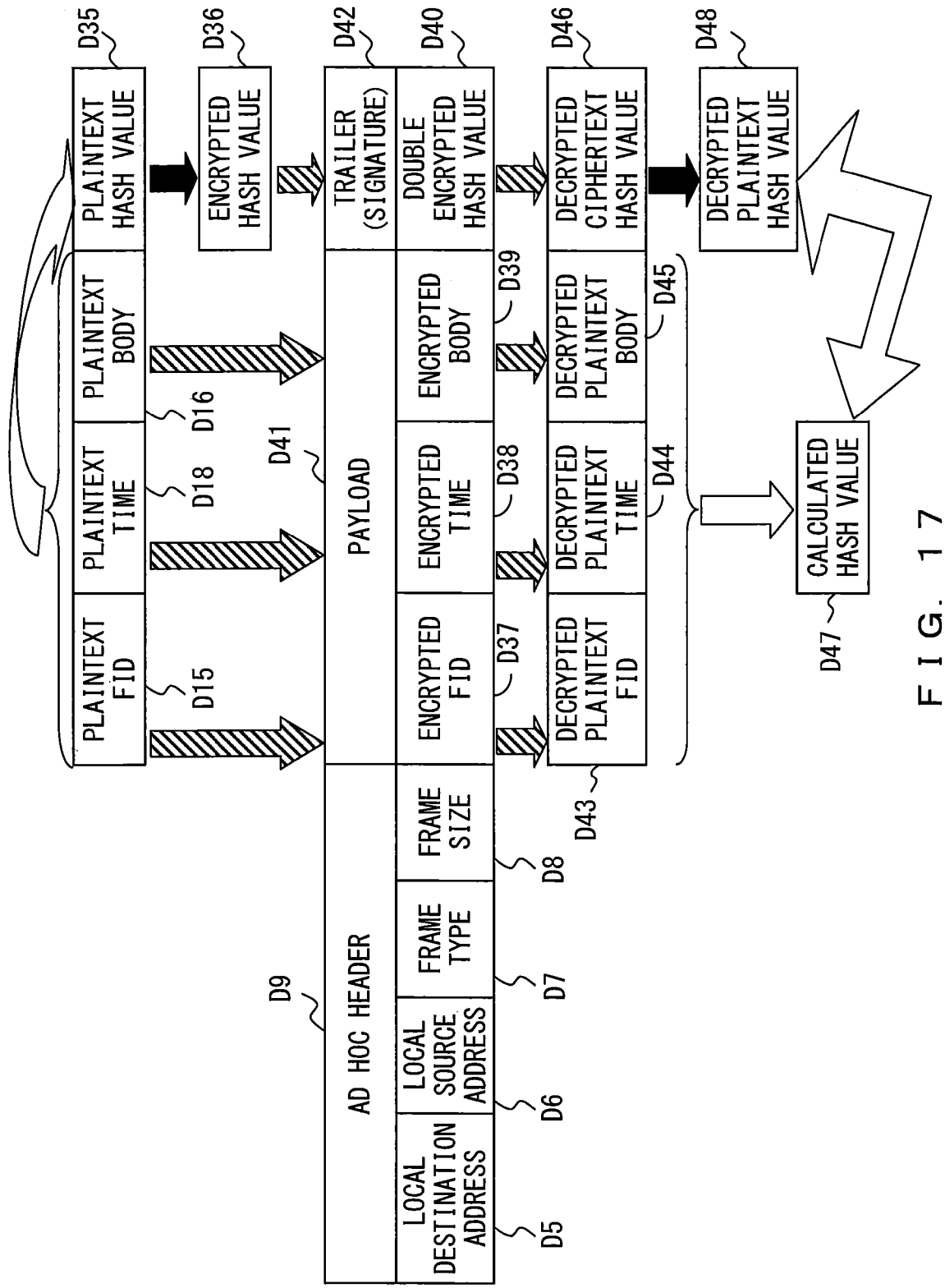
FIG. 17 is a diagram illustrating a second example of a format of a data frame and various processes performed regarding the data frame.

Meanwhile, in FIG. 15 and FIG. 17, encryption and decryption by the shared key are expressed with a black arrow, and encryption and decryption by the access key are expressed with a hatched arrow.

As described above, a payload D26 formed by the encrypted FID D22 and the encrypted body D23, and a trailer D27 as a signature formed by the double encrypted hash value D24 and the double encrypted time D25 are generated. Therefore, in step S504, the data frame encryption unit 39 concatenates the payload D26 and the trailer D27 to the ad hoc header D9 to create the data frame, and outputs it to the data frame transmission buffer 43.

Finally, in step S505, the transmission unit 7 transmits the data frame. That is, the data frame stored temporarily in the data frame transmission buffer 43 as a result of step S504 is read out and transmitted by the transmission processing unit 44 in step S505.

Figure 16:
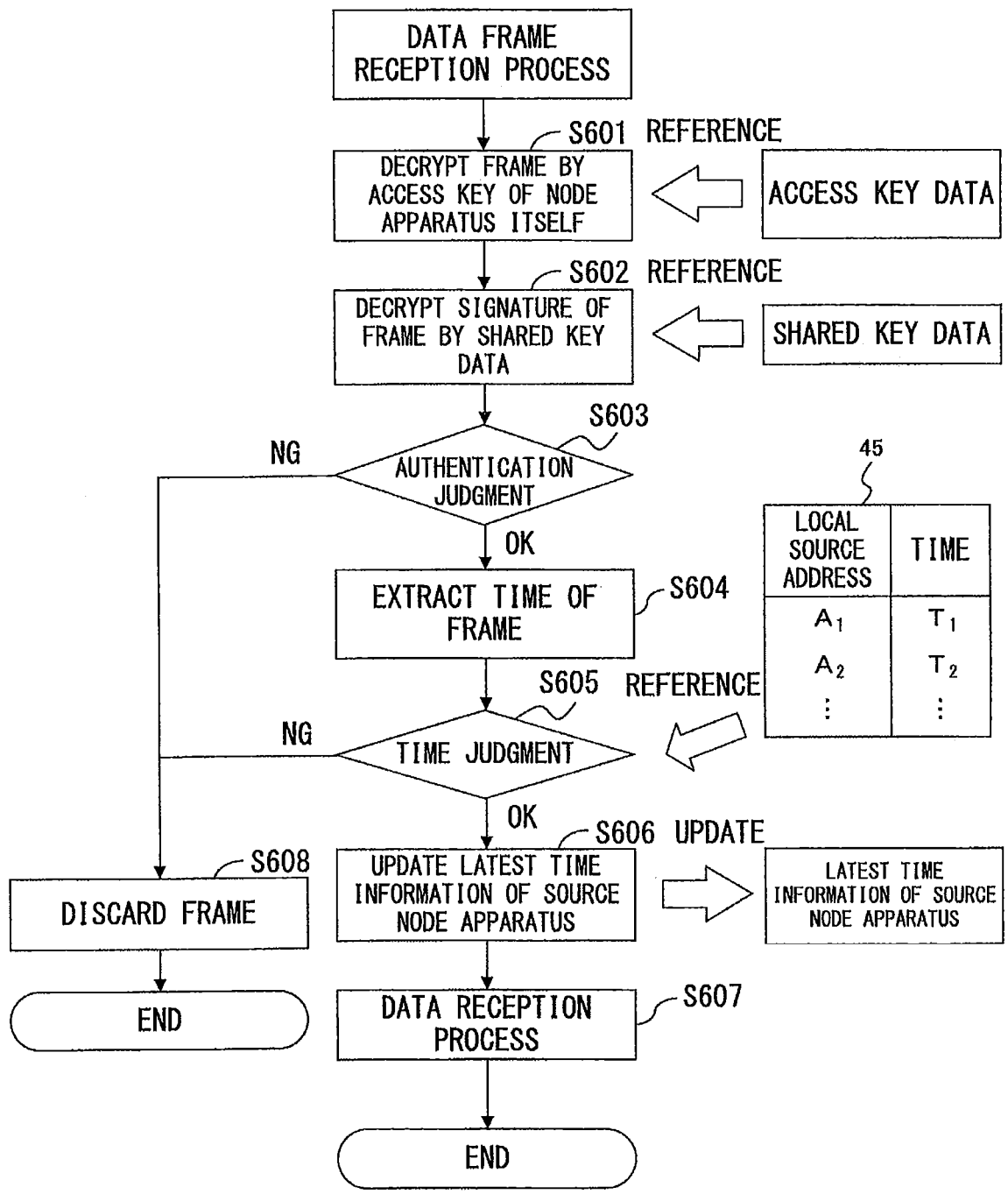
FIG. 16 is a flowchart of a data frame reception process.

FIG. 16 is a flowchart of a data frame reception process. In step S3 of FIG. 7, 1B, and in step S4, the node apparatus 1A perform the process in FIG. 16.

Hereinafter, for the convenience of explanation, a case is described in which in step S3 in FIG. 7, the node apparatus 1B receives the data frame encrypted by the access key b1 in the reception unit 8.

When the above-mentioned data frame is received by the node apparatus 1B, the frame branching processing unit 21 judges that "the received frame is a data frame" according to the frame type D7 of the ad hoc header D9. Then, triggered by the judgment, the process in FIG. 16 is started. In addition, the received frame judged to be a data frame by the frame branching unit 21 is temporarily stored in the data frame reception buffer 24.

In step S601, the data frame decryption unit 27 of the decryption unit 5 decrypts the received frame using the access key of the node apparatus 1B itself. That is, the data frame decryption unit 27 refers to the access key storage unit 31 and reads out the data of the access key b1 being the internally-originated access key for the node apparatus 1B itself. Then, using the access key b1, the data frame decryption unit 27 decrypts the data frame (in this embodiment, to be exact, its payload and trailer) stored in the data frame reception buffer 24.

That is, the data frame decryption unit 27 generates a key stream from the access key b1, and obtains the XOR of the ciphertext (that is, the part formed by the payload D26 and the trailer D27 in FIG. 15) and the key stream. By this, the data frame decryption unit 27 obtains a decrypted plaintext FID D28 from the encrypted FID D22 and obtains a decrypted plaintext body D29 from the encrypted body D23. In addition, the data frame decryption unit 27 obtains a decrypted ciphertext hash value D30 from the double encrypted hash value D24 and obtains a decrypted ciphertext time D31 from the double encrypted time D25. That is, the data frame decryption unit 27 obtains the encrypted signature from the double encrypted signature.

Next, in step S602, the data frame decryption unit 27 refers to the shared key storage unit 32 to read out the data of the shared key, and decrypts, using the shared key, the encrypted signature formed by the decrypted ciphertext hash value D30 and the decrypted ciphertext time D31. As a result, a decrypted plaintext hash value D33 is obtained from the decrypted ciphertext hash value D30 and a decrypted plaintext time D34 is obtained from the decrypted ciphertext time D31.

Then, the data frame decryption unit 27 outputs the ad hoc header D9, the decrypted plaintext FID D28, the decrypted plaintext body D29, the decrypted plaintext hash value D33 and the decrypted plaintext time D34 to the confirmation unit 29 as a decrypted plaintext frame.

In step S603, the confirmation unit 29 extracts a part (hereinafter, referred to as a "decrypted plaintext payload") formed by the decrypted plaintext FID D28 and the decrypted plaintext body D29 from the input from the data frame decryption unit 27. Then, the confirmation unit 29 calculates the hash value of the decrypted plaintext payload and obtains a calculated hash value D32 in FIG. 15.

In step S603, as an authentication judgment process of the received data frame, the confirmation unit 29 compares the calculated hash value D32 and the decrypted plaintext hash value D33. If the received data frame is an authentic data frame that is not subjected to tampering and the like, the calculated hash value D32 and the decrypted plaintext hash value D33 match each other.

Therefore, when the calculated hash value D32 and the decrypted plaintext hash value D33 match each other, the confirmation unit 29 judges as "OK", and the process shifts to step S604. On the other hand, when the calculated hash value D32 and the decrypted plaintext hash value D33 do not match each other, the confirmation unit 29 judges as "NG", and the process shifts to step S608.

In step S604, the confirmation unit 29 extracts a decrypted plaintext time D34. Since step S604 is performed when judgment as "OK" is made in step S603, the decrypted plaintext time D34 is equal to the original plaintext time D18. In addition, the confirmation unit 29 also extracts the local source address D6 in step S604.

Then, in step S605, the confirmation unit 29 performs a time judgment process. The time judgment process is a process for protection against a spoofing attack. Meanwhile, in this Specification, it is referred to as a spoofing attack that a fraudulent third party intercepts (that is, captures) the data frame, copies or partially alternates the intercepted data frame, and transmits it.

Specifically, the confirmation unit 29 performs the time judgment process referring to the latest transmission time storage unit 45 in FIG. 5. As illustrated in FIG. 16, the latest transmission time storage unit 45 stores an entry associating the local source address with the time.

For example, the first entry illustrated in FIG. 16 associates the local source address $A_1$ with the time $T_1$. In addition, as described above, the description of FIG. 16 is for an example of a case in which the node apparatus 13 performs the process in FIG. 16. Therefore, the first entry illustrated in FIG. 16 indicates that "the decrypted plaintext time D34 obtained from the latest data frame received by the node apparatus 1B from the node apparatus identified by the local source address $A_1$ is $T_1$".

While the latest transmission time storage unit 45 at the time when the power of the node apparatus 1B is turned on, that is, in the initial status does not store any entry, by step S606 described later, an entry is added to the latest transmission time storage unit 45, or an existing entry is updated.

In step S605, the confirmation unit 29 searches the latest transmission time storage unit 45 using the extracted local source address D6 as the search key. When no entry whose "local source address" field matches the extracted local source address D6 is found as a result of the search, the confirmation unit 29 judges that "the received data frame is not a data frame transmitted by a spoofing attack". That is, the confirmation unit 29 judges that "the received frame is an authentic data frame", and the process shifts to step S606.

On the contrary, when an entry whose "local source address" field matches the extracted local source address D6 is found as a result of the search, there is a possibility that the received data frame has been transmitted by a spoofing attack. Therefore, the confirmation unit 29 compares the value of the "time" field of the found entry with the decrypted plaintext time D34 extracted in step S604.

When the two times match each other, the confirmation unit 29 judges that "the received data frame is one sent by a spoofing attack", and the process shifts to step S608. On the other hand, when the two times do not match each other, the confirmation unit 29 judges that "a new data frame that is different from the ones received so far by the node apparatus 1B has been transmitted authentically from the node apparatus identified by the local source address D6", and the process shifts to step S606.

In step S606, the confirmation unit 29 updates latest time information of the node apparatus identified by the local source address D6.

In other words, when no entry is found in the search in step S605, the confirmation unit 29 creates a new entry associating the local source address D6 and the decrypted plaintext time D34 and stores it into the latest transmission time storage unit 45. Meanwhile, when an entry is found in the search in step S605, the confirmation unit 29 overwrites the value of the "time" field of the found entry with the decrypted plaintext time D34.

Upon updating the latest time information held by the latest transmission time storage unit 45 as described above, the confirmation unit 29 outputs the plaintext frame to the received data frame processing unit 30.

Then, in step S607, the received data frame processing unit 30 performs a process according to embodiments using the input from the confirmation unit 29.

For example, the final destination (that is, the global destination) of target data may be specified in the decrypted plaintext body D29. Then, the received data frame processing unit 30 may judge whether to need to forward the data frame according to the global destination and, if forwarding it, may determine a local destination followed by instructing the data frame creation unit 40 to compose a new data frame.

In addition, using the decrypted plaintext FID D28 and the decrypted plaintext time D34, the received data frame processing unit 30 may distinguish a fraudulent data frame and an authentic data frame, or judge whether or not the received data frame is one that has been resent, as described with regard to FIG. 8.

In addition, in step S608, the received data frame is discarded, and the process in FIG. 16 is terminated. That is, in step S608, the confirmation unit 29 does not output data to the received data frame processing unit 30.

The series of processes with regard to the transmission and reception of the data frame described above with reference to FIG. 14-FIG. 16 may be modified as needed according to the format of the data frame. A specific example of it is described with FIG. 17.

FIG. 17 is a diagram which illustrates the second example of a format of the data frame and various processes performed with regard to the data frame. FIG. 17 is an example of a format to which that in FIG. 8 is specialized.

Hereinafter, with an example of a case in which the data frame is transmitted from the node apparatus 1A to the node apparatus 1B, details of the processes corresponding to FIG. 17 are explained.

The data frame creation unit 40 of the node apparatus 1A calculates the hash value of a plaintext payload formed by the plaintext FID D15, the plaintext time D18 and the plaintext body D16, to obtain a plaintext hash value D35. Then, the data frame encryption unit 39 of the node apparatus 1A encrypts the plaintext hash value D35 using the shared key to obtain an encrypted hash value D36, and encrypts the part formed by the plaintext payload and the encrypted hash value D36 by the access key b1 of the node apparatus 1B.

As a result, an encrypted FID D37 is obtained from the plaintext FID D15, an encrypted time D38 is obtained from the plaintext time D18, an encrypted body D39 is obtained from the plaintext body D16, and a double encrypted hash value D40 is obtained from the encrypted hash value D36.

The data frame encryption unit 39 of the node apparatus 1A concatenate, to the ad hoc header D9, a payload D41 formed by the encrypted FID D37, the encrypted time D38 and the encrypted body D39, and the double encrypted hash value D40 as a trailer D42. The encrypted data frame completed by the concatenation is temporality stored in the data frame transmission buffer 43, and transmitted from the transmission processing unit 44.

Then, in the node apparatus 1B that receives the encrypted data frame, the frame branching processing unit 21 judges that "the received frame is a data frame" according to the frame type D7, and the received frame is stored in the data frame reception buffer 24. Then, the data frame decryption unit 27 decrypts the payload D41 and the trailer D42 by the access key b1 of the node apparatus 1B itself.

As a result, a decrypted plaintext FID D43 is obtained from the encrypted FID D37, a decrypted plaintext time D44 is obtained from the encrypted time D38, and a decrypted plaintext body D45 is obtained from the encrypted body D39. In addition, a decrypted ciphertext hash value D46 is obtained from the double encrypted hash value D40. The data frame decryption unit 27 further obtains a decrypted plaintext hash value D48 by decrypting the decrypted ciphertext hash value D46 by the shared key.

Then, the confirmation unit 29 of the node apparatus 1B calculates the hash value of the part formed by the decrypted plaintext FID D43, the decrypted plaintext time D44 and the decrypted plaintext body D45, to obtain a calculated hash value D47. Then, the confirmation unit 29 compares the calculated hash value D47 and the decrypted plaintext hash value D48, and if they do not match each other, discards the data frame.

When the calculated hash value D47 and the decrypted plaintext hash value D48 match each other, the confirmation unit 29 further searches the latest transmission time storage unit 45 using the local source address D6 as the search key, and performs the same time judgment process as that in step S605 in FIG. 16. The processes after step S605 are the same as those described with regard to FIG. 16.

As described above, the node apparatuses according to the present embodiment exchange their access keys using the shared key updated at predetermined intervals and distinguish between a fraudulent access by a third party and an access from an authentic node apparatus using the shared key and the access keys. To this end, the timing to update the shared key and the access key needs to be matched between the node apparatuses. That is, synchronization between the node apparatuses within the network needs to be performed about the time in the node apparatuses. The synchronization method of the time is described below.

Figure 18:
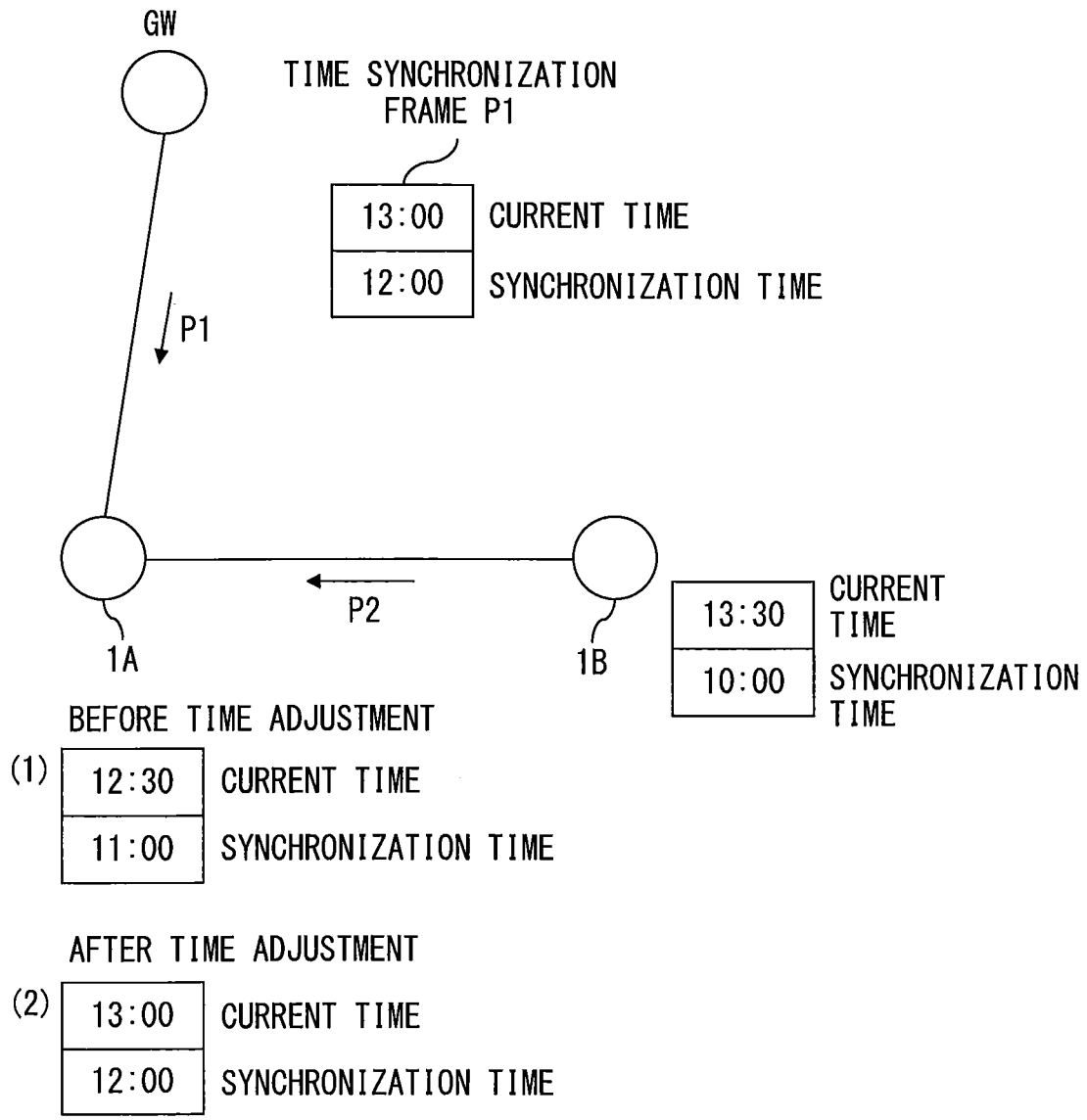
FIG. 18 is a diagram illustrating a synchronization method of time.

FIG. 18 is a diagram which illustrates the synchronization method of the time. The explanation is made with an example of a case in which the time is adjusted by synchronization of the time in the node apparatus 1A in FIG. 18.

The node apparatus 1A makes a storage unit (the DRAM 15 for example) store the current time of the node apparatus 1A itself and the last time at which time adjustment is performed. Then, upon receiving a time synchronization frame for time synchronization, it takes out information related to the time from the time synchronization frame, and compares that with the information stored in the node apparatus 1A itself. If the node apparatus 1A judges as a result of the comparison that synchronization is needed, it performs time adjustment according to information included in the time synchronization frame.

The time synchronization frame is, in this embodiment, a type of frames for control in a format similar to that of the hello frame, and includes data representing the current time and the time (hereinafter, referred to as a "synchronization time") at which time adjustment is performed. Here, the current time refers to the time in the node apparatus 1 itself at the time the time synchronization frame is generated, and the synchronization time refers to the time at which the time synchronization is performed in a predetermined apparatus. The predetermined apparatus is the gateway apparatus GW in this embodiment and time synchronization refers to the execution of time synchronization in the gateway apparatus GW by, for example, SNTP (Simple Network Time Protocol) and the like.

In the gateway apparatus GW, periodically, for example once in two hours, time synchronization is performed by SNTP and the like. Each node apparatus 1 stores the current time of the node apparatus 1 itself and the synchronization time in the time synchronization frame, and broadcasts them by the time synchronization frame. The time synchronization frame is transmitted at a predetermined timing (for example, once in two hours) while encrypted using a fixed time synchronization key that is different from the above-mentioned shared key that changes according to time.

In the example illustrated in FIG. 18, in the gateway apparatus GW, synchronization of the time is performed by SNTP and the like at 12:00, and a time synchronization frame P1 is generated and transmitted at 13:00.

The node apparatus 1A that receives the time synchronization frame P1 compares the last synchronization time stored in the node apparatus 1A itself and the synchronization time of the time synchronization frame P1. In the example of FIG. 18, the synchronization time (12:00) of the time synchronization frame P1 is more recent than the stored last synchronization time (11:00). In this case, the node apparatus 1A sets, as its current time, the current time (13:00) stored in the received time synchronization frame.

Here, the node apparatus 1A may receive a time synchronization frame depending on synchronization at a time that is not the latest, such as a time synchronization frame P2 transmitted from the node apparatus 1B. When the node apparatus 1A receives the time synchronization frame P2, it does not perform synchronization of the time since the last synchronization time (11:00) stored in the node apparatus 1A itself is more recent than the synchronization time (10:00) of the time synchronization frame P2.

Next, the example of FIG. 18 is described in greater detail with reference to FIG. 19-FIG. 21.

Figure 19:
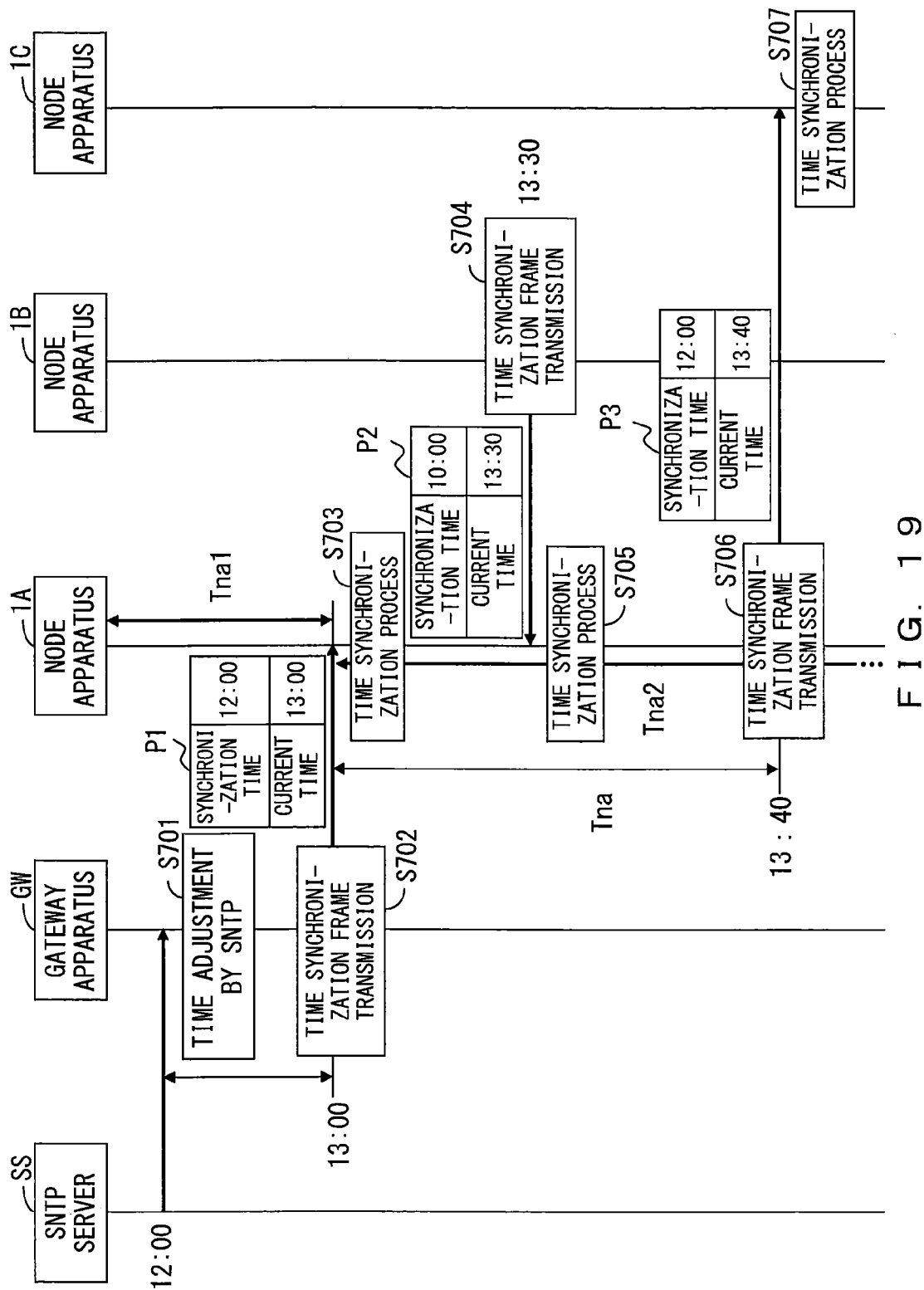
FIG. 19 is a sequence diagram illustrating a synchronization method of time.

FIG. 19 is a sequence diagram describing the synchronization method of the time described with reference to FIG. 18. FIG. 19 illustrates an SNTP server SS, a gateway apparatus GW and node apparatuses 1A-1C. Hereinafter, it is assumed that in the ad hoc network, the gateway apparatus GW and the node apparatus 1A are adjacent to each other, and the node apparatus 1A is also adjacent to the node apparatuses 1B and 1C.

Meanwhile, all of the gateway apparatus GW and the node apparatuses 1A-1C have the respective units in FIG. 5. In addition, a time adjustment function by SNTP is implemented further in the gateway apparatus GW.

As illustrated in step S701, when the time in the clock 33 of the gateway apparatus GW itself becomes 12:00, the gateway apparatus GW accesses an SNTP server SS by SNTP and performs time adjustment according to a predetermined schedule.

In addition, in the gateway apparatus GW, a schedule such as "transmit at 13:00" is set in advance for the timing to transmit the time synchronization frame as well. Therefore, when the clock of the gateway apparatus GW adjusted appropriately as a result of the time adjustment in step S701 points to 13:00, the gateway apparatus GW transmits the time synchronization frame P1 as illustrated in step S702.

Meanwhile, with respect to the timing to transmit the time synchronization frame, a different time may be set for each of the plurality of adjacent node apparatuses.

While the illustration of details of the format of the time synchronization frame is omitted in the drawing, the time synchronization frame includes the ad-hoc header D9 similar to that for the hello frame in FIG. 12, and further includes an encrypted payload obtained by encrypting, using the time synchronization key, a plaintext payload including two fields of "synchronization time" and "current time".

For example, in step S702, the gateway apparatus GW transmits the time synchronization frame P1 indicating that "the synchronization time is 12:00 and the current time is 13:00". That is, the value of the synchronization time field is the time on which the gateway apparatus GW itself performed the time adjustment in step S701, and the value of the current time field is the time at which the gateway apparatus GW transmits the time synchronization frame P1.

Meanwhile, hereinafter, the local destination address of the time synchronization frame P1 is assumed as the address of the node apparatus 1A. Details of the time synchronization frame transmission process are described later with FIG. 20.

Incidentally, in the present embodiment, the transmission delay time between apparatuses adjacent to each other in the ad hoc network is regarded as zero. Thus, the time synchronization frame P1 is received in the node apparatus 1A at 13:00 indicated by the clock 33 of the gateway apparatus GW. However, the clock 33 of the node apparatus 1A at the time when the time synchronization frame P1 is received may be pointing to 12:58 or to 13:03.

Therefore, the node apparatus 1A that received the time synchronization frame P1 performs time adjustment (that is, the time synchronization process) of the clock 33 of the node apparatus 1A itself in step S703. As a result, the clock 33 of the node apparatus 1A is corrected to 13:00. Meanwhile, time synchronization process instep S703 is, specifically, the time synchronization frame reception process in FIG. 21.

The event that the clock 33 of the node apparatus 1A is corrected in step S703 can be expressed in other words that the node apparatus 1A switches from a time zone Tna1 to a time zone Tna2 in step S703.

In addition, the individual node apparatuses 1A-1C perform a time synchronization frame transmission process according to individual schedule setting. For example, in the example of FIG. 19, the node apparatus 1B transmits the time synchronization frame P2 when the clock of the node apparatus 1B points to 13:30, as illustrated in step S704. The time synchronization frame P2 indicates that "the synchronization time is 10:00 and the current time is 13:30". In addition, the local destination address of the time synchronization frame P2 is assumed as the address of the node apparatus 1A.

Then, the node apparatus 1A receives the time synchronization frame P2, and triggered by the reception of the time synchronization frame P2, performs the time synchronization process as illustrated in step S705. However, 10:00 indicated as the synchronization time in the time synchronization frame P2 is less recent than 12:00 indicated as the synchronization time in the time synchronization frame P1 used in the time synchronization process performed previously in step S703. Therefore, as details are described with FIG. 21 later, the node apparatus 1A does not update the clock 33 in step S705.

Incidentally, in the individual node apparatuses 1A-1C, an interval Tnax from the correction of the clock 33 by the time synchronization process to the transmission of the time synchronization frame to other adjacent node apparatuses is set in advance. For example, the interval Tnax set in the node apparatus 1A is 40 minutes.

Different random intervals may be set for the individual node apparatuses 1A-1C. In addition, for the node apparatus 1A, the intervals from the correction of the clock 33 to the transmission of the time synchronization frame to the plurality of node apparatuses 1B and 1C respectively may be set as the same value (for example, the interval Tnax described above). Alternatively, on the contrary, in one node apparatus 1A, the interval (not illustrated in FIG. 19) from the correction of the clock 33 to the transmission of the time synchronization frame to the node apparatus 1B and the interval Tnax from the correction of the clock 33 to the transmission of the time synchronization frame to the node apparatus 1C may be set to different values.

According to the setting, when the predetermined time (that is, Tnax=40 minutes) passes after the clock 33 is corrected, the node apparatus 1A performs the time synchronization frame transmission process as illustrated in step S706. In step S706, a time synchronization frame P3 indicating that "the synchronization time is 12:00 and the current time is 13:40" is transmitted.

The reason why the time synchronization frame P3 indicates that "the synchronization time is 12:00" is because the time synchronization frame P1, which triggered the node apparatus 1A to correct the clock 33, indicates 12:00 as the synchronization time. In addition, the reason why the time synchronization frame P3 indicates that "the current time is 13:40" is because the time synchronization frame P3 is transmitted at 13:40.

Then, when the time synchronization frame P3 is received in the node apparatus 1C, the node apparatus 1C performs the time synchronization process as illustrated in step S707.

FIG. 20 is a flowchart of the time synchronization frame transmission process. For example, in step S702 in FIG. 19, the gateway apparatus GW, in step S704, the node apparatus 1B, and in step S706, the node apparatus 1A, respectively, perform the process in FIG. 20.

For example, the time synchronization unit 9 of the node apparatus 1A may be equipped with a second counter that is different from the counter 34 in FIG. 5 and that is not illustrated in the drawing. The second counter may be realized by, for example, a hardware circuit similar to the timer IC 13 in FIG. 4.

In the second counter, a value representing the interval Tnax is set. Then, the time synchronization unit 9 clears the second counter when a time synchronization frame reception process described later with FIG. 21 is terminated. When the second counter counts up to the value representing the interval Tnax, the time synchronization unit starts the process in FIG. 20.

Alternatively, the time synchronization unit 9 may store the time to which the clock 33 is corrected, then may judge whether or not the interval Tnax has passed since the stored time by referring to the clock 33, and if the interval Tnax has passed, may start the process in FIG. 20.

When the process in FIG. 20 is started, in step S801, the time synchronization unit 9 sets, as the synchronization time in the frame, the last synchronization time held in the node apparatus 1 itself.

Figure 21:
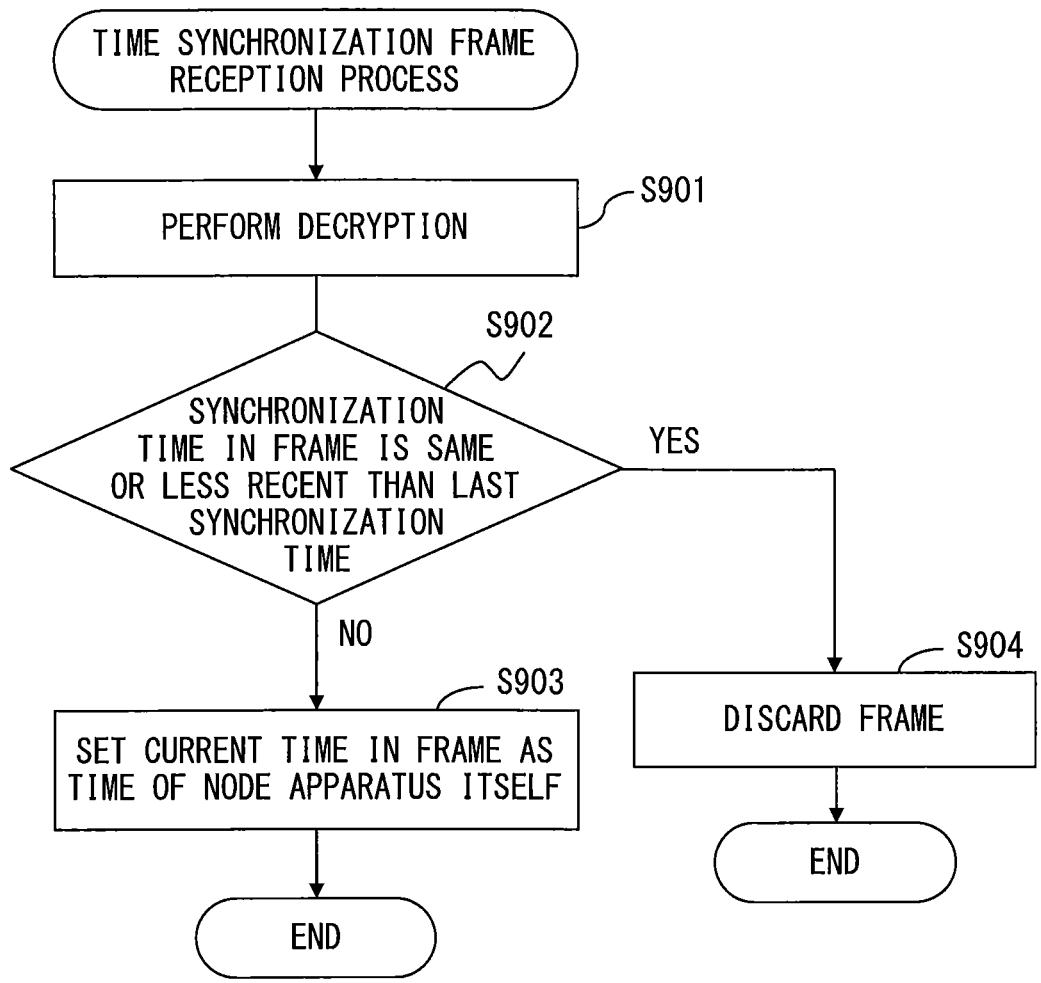
FIG. 21 is a flowchart of a time synchronization frame reception process.

The time synchronization unit 9 holds, in the DRAM 15 for example, the time obtained from the synchronization time field of the time synchronization frame when the process in FIG. 21 is last performed, as the "last synchronization time" in the node apparatus 1 itself. Then, in step S801, the time synchronization unit 9 sets the value of the held last synchronization time in the synchronization time field of a plaintext frame to be newly created.

For example, in the example of FIG. 19, in a case in which the time synchronization unit 9 of the node apparatus 1A performs step S706, the time synchronization unit 9 holds 12:00 that is the synchronization time indicated by the time synchronization frame P1, which triggered the correction of the clock 33 in step S703, as the last synchronization time. Therefore, in step S801 in the process in FIG. 20 invoked by step S706, the time synchronization unit 9 sets 12:00 in the synchronization time field of a plaintext frame to be newly created.

Next, in step S802, the time synchronization unit 9 sets, as the "current time" in the frame (that is, the plaintext frame to be newly created), the time when the node apparatus 1 itself transmits the time synchronization frame. To be more exact, the time pointed to by the clock 33 when step S802 is executed is regarded approximately as the time when the time synchronization frame is transmitted from the node apparatus 1, and set in the current time field of the plaintext frame by the time synchronization unit 9.

For example, in the example of FIG. 19, in a case in which the time synchronization unit 9 of the node apparatus 1A performs step S706, in step S802 in the process in FIG. 20 invoked by step S706, the time synchronization unit 9 sets 13:40 to the current time field of the plaintext frame.

Then, in step S803, the time synchronization unit 9 creates the header of the time synchronization frame, and prepends the created header to the plaintext payload (including the synchronization time and the current time). The header created in step S803 is, for example, in the same format as the ad hoc header D9 of the hello frame. Then, the time synchronization unit 9 outputs the plaintext frame formed by the header and the plaintext payload to the time synchronization frame encryption unit 38.

Then, in step S804, the time synchronization frame encryption unit 38 refers to the time synchronization key storage unit 35 to read out the time synchronization key, and encrypts the plaintext payload using the time synchronization key. For example, when the encryption algorithm for the encryption of the time synchronization frame is also RC4, the time synchronization frame encryption unit 38 performs, specifically, the generation of a key stream and the XOR operation in step S804. The time synchronization frame encryption unit 38 outputs the time synchronization frame formed by the header prepended in step S803 and the payload encrypted in step S804 to the time synchronization frame transmission buffer 42.

Finally in step S805, the transmission unit 7 transmits the time synchronization frame. That is, the transmission processing unit 44 transmits the time synchronization frame temporarily stored in the time synchronization frame transmission buffer 42, and the process in FIG. 20 is terminated.

FIG. 21 is a flowchart of the time synchronization frame reception process. For example, in steps S703 and S705 in FIG. 19, the node apparatus 1A performs the process in FIG. 21. The process in FIG. 21 is started, when triggered by the node apparatus 1 receiving a frame at the reception unit 8 and the frame branching processing unit 21 of the reception unit 8 judging that "the received frame is a time synchronization frame" according to the frame type D7 of the ad hoc header D9. Meanwhile, when the frame branching processing unit 21 judges that "the received frame is a time synchronization frame", the received frame is output to, and stored in, the time synchronization frame reception buffer 23.

In step S901, the time synchronization frame decryption unit 26 reads out the time synchronization frame from the time synchronization frame reception buffer 23 and performs decryption. That is, the time synchronization frame decryption unit 26 refers to the time synchronization key storage unit 35 to read out time synchronization key, and decrypts the encrypted payload of the time synchronization frame using the time synchronization key.

As described above, when the encryption algorithm for the encryption of the time synchronization frame is also RC4, the time synchronization frame decryption unit 26 performs, specifically, the generation of a key stream and the XOR operation in step S901.

In addition, after the decryption, the time synchronization frame decryption unit 26 outputs the header and the plaintext payload obtained by the decryption to the time synchronization unit 9.

Then, in step S902, the time synchronization unit 9 extracts the value of the synchronization time field from the plaintext payload and reads out the last synchronization time held in the DRAM 15 for example. Then, the time synchronization unit 9 compares the extracted synchronization time and the read-out last synchronization time.

When the synchronization time is more recent than the last synchronization time, the process shifts to step S903. On the other hand, when the synchronization time is the same as the last synchronization time or when the synchronization time is less recent than the last synchronization time, the process shifts to step S904.

In step S903, the time synchronization unit 9 sets the current time of the time synchronization frame as the time of the node apparatus 1. That is, the time synchronization unit 9 corrects the time of the clock 33 by extracting the value of the current time field of the time synchronization frame and setting the extracted value in the clock 33. Then, the process in FIG. 21 is terminated.

For example, when the process in FIG. 21 is invoked from step S703 in FIG. 19, step S903 is performed, and the time synchronization unit 9 corrects the clock 33.

In addition, in step S904, the time synchronization unit 9 discards the time synchronization frame, and the process in FIG. 21 is terminated. For example, when the process in FIG. 21 is invoked from step S705 in FIG. 19, step S904 is performed.

Meanwhile, as explained with regard to FIG. 20 and FIG. 21, the time synchronization frame of the present embodiment does not particularly include a trailer such as a signature, but an embodiment to use a time synchronization frame in a format in which the hash value of the plaintext payload is attached as a trailer is also possible.

In that case, in the time synchronization frame transmission process, the time synchronization unit 9 performs the calculation of the hash value, and the time synchronization frame encryption unit 38 encrypts both the payload and the trailer. In addition, in the time synchronization frame reception process, the time synchronization frame decryption unit 26 decrypts both the payload and trailer. Then, the confirmation unit 29 calculates the hash value from the plaintext payload obtained by the decryption and compares the calculated hash value and the plaintext hash value obtained by the decryption, and only when the two hash values match each other, the time synchronization unit 9 performs the processes in and after step S902.

When the number of node apparatuses constituting the ad hoc communication network is large, a configuration in which each node apparatus performs synchronization with the time of one predetermined apparatus such as the gateway apparatus leads to an increase in traffic. On the other hand, according to the present embodiment, even when there are a large number of node apparatuses, each node apparatus performs time adjustment by receiving the time synchronization frame from a node apparatus among adjacent node apparatuses that has already performed synchronization, as in the time synchronization method described above. Therefore, according to the present embodiment, each node apparatus can perform synchronization of the time without increasing the traffic of the network as a whole.

While the present embodiment has been described above in detail with reference to FIG. 1 to FIG. 21, the overview of the node apparatus 1 in the present embodiment is as follows.

The node apparatus 1 illustrated in FIG. 3-FIG. 5 is one of node apparatuses in a network constituted by a plurality of node apparatuses as illustrated in FIG. 2, FIG. 6, FIG. 7, FIG. 18 and FIG. 19, for example. Here, for convenience of explanation, the configuration of the first node apparatus 1A is overviewed while focusing on the first node apparatus 1A and the second node apparatus 1B among the plurality of node apparatuses.

As illustrated in FIG. 3 and FIG. 5, the first node apparatus 1A has the access key generation unit 2 to change and generate a first access key being a cryptographic key unique to the first node apparatus 1A at intervals of a first time. Here, the "first access key" is, for example, the access key a1 in FIG. 6, and the "first time" is, for example, in the example of the embodiment described above, $t_1=10$ (minutes).

In addition, as illustrated in FIG. 3 and FIG. 5, the first node apparatus 1A has the shared key generation unit 3 to change and generate a shared key being same for the plurality of node apparatuses in the network at intervals of a second time being same for the plurality of node apparatuses. Here, the "second time" is, in the example of the embodiment described above, $t_2=12$ (hours).

In addition, the first node apparatus 1A has components that operate as an access key notification unit to encrypt the generated first access key using the generated shared key and to transmit it to the second node apparatus 1B. That is, the frame processing unit 6, the encryption unit 4 and the transmission unit 7 in FIG. 3 cooperatively operate as the above-mentioned access key notification unit. More specifically, the hello frame creation unit 36, the hello frame encryption unit 37, the hello frame transmission buffer 41 and the transmission processing unit 44 in FIG. 5 cooperatively operate as the above-mentioned access key notification unit.

In addition, the first node apparatus 1A has components that operate as an access key reception unit to receive an access key notification frame transmitted from the second node apparatus 1B. Here, the "access key notification frame" includes access key notification data being data obtained by encrypting a second access key being a cryptographic key unique to the second node apparatus 1B using the shared key, and specifically, is the encrypted hello frame in the embodiment described above. In addition, the "second access key" is the access key b1 in FIG. 6 for example, and the "access key notification data" is the encrypted access key D3 in FIG. 12 for example.

Note that, in the embodiment described above, the reception unit 8 in FIG. 3 (more specifically, the frame branching processing unit 21 and the hello frame reception buffer 22 in FIG. 5) operates as the access key reception unit.

In addition, the first node apparatus 1A has a component that operates as an access key decryption unit to obtain the second access key from the access key notification data by decrypting the access key notification data using the generated shared key. That is, in the embodiment described above, the decryption unit 5 in FIG. 3 (more specifically, the hello frame decryption unit 25 in FIG. 5) operates as the above-mentioned access key decryption unit and obtains the access key b1.

In addition, the first node apparatus 1A has components that operate as a data transmission unit. The data transmission unit attaches, to a first plaintext frame, first signature data obtained by encrypting, using the shared key, data including a first hash value calculated from the first plaintext frame. Then, the data transmission unit encrypts the first plaintext frame, to which the first signature data is attached, into a first encrypted frame using the second access key obtained by decryption and transmits the first encrypted frame.

Here, an example of the "first plaintext frame" is a plaintext frame that is described with regard to FIG. 15 and that includes the ad hoc header D9 and the plaintext payload formed by the plaintext FID D15 and the plaintext body D16. An example of the "first hash value" is the plaintext hash value D17 in FIG. 15 calculated from the plaintext frame (to be more exact, from the plaintext payload), for which the trailer has not been created yet, and an example of the "first signature data" is the encrypted signature D21. In some embodiments, the header may further be used for the calculation of the hash value. In addition, the "second access key" is, specifically, the access key b1 in FIG. 6.

In the embodiment described above, the encryption unit 4 and the transmission unit 7 in FIG. 3 (more specifically, the data frame encryption unit 39, the data frame transmission buffer 43 and the transmission processing unit 44 in FIG. 5) cooperatively operate as the above-mentioned data transmission unit.

In addition, the first node apparatus 1A has the reception unit 8 in FIG. 3 (more specifically, the frame branching processing unit 21 and the data frame reception buffer 24 in FIG. 5) that operates as a data reception unit to receive a second encrypted frame from the second node apparatus 1B. Here, the "second encrypted frame" is a frame obtained by encrypting a second plaintext frame by the first access key, and the "second plaintext frame" is a frame to which a second signature data obtained by encrypting data including a second hash value by the shared key is attached.

In addition, the first node apparatus 1A has the decryption unit 5 in FIG. 3 (more specifically, the data frame decryption unit 27 in FIG. 5) that operates as a data decryption unit. The above-mentioned data decryption unit decrypts the second encrypted frame by the first access key, and obtains the second plaintext frame, to which the second signature data is attached, from the second encrypted frame.

While in the description of the embodiment above, the example of FIG. 15 is described in line with the case of data frame transmission from the node apparatus 1A to the node apparatus 1B, FIG. 15 is also applicable to the case of data transmission from the node apparatus 1B to the node apparatus 1A. In this case, the data frame in FIG. 15 formed by the ad hoc header D9, the payload D26 and the trailer D27 corresponds to the "second encrypted frame" transmitted from the node apparatus 1B.

Then, the data frame decryption unit 27, which operates as the above-mentioned data decryption unit, of the node apparatus 1A obtains the second plaintext frame using the access key a1 being the "first access key". Here, the "second plaintext frame" includes the ad hoc header D9 and the plaintext payload formed by the decrypted plaintext FID D28 and the decrypted plaintext body D29. In addition, to the "second plaintext frame", an encrypted signature (corresponding to the "second signature data" described above) formed by the decrypted ciphertext hash value D30 and the decrypted ciphertext time D31 is attached as a trailer.

In addition, the first node apparatus 1A has components that operate as a consistency confirmation unit. In the embodiment described above, the data frame decryption unit 27 and the confirmation unit 29 in FIG. 5 cooperatively operate as the consistency confirmation unit. Specifically, the data frame decryption unit 27 as a part of the consistency confirmation unit obtains the second hash value by decrypting the second signature data using the generated shared key. Then, the confirmation unit 29 as a part of the consistency confirmation unit calculates a third hash value (for example, the calculated hash value D32 in FIG. 15) from the second plaintext frame, and confirms whether or not the second hash value and the third hash value are consistent with each other.

Furthermore, the data transmission unit described above may include, in the first plaintext frame, a first identifier for uniquely identifying the first plaintext frame, and information indicating a first transmission time.

In the embodiment described above, the data frame creation unit 40 also operates as a part of the data transmission unit, and the data frame creation unit 40 includes, in the first plaintext frame, the plaintext FID D15 in FIG. 17 as the "first identifier" and the plaintext time D18 as the "information indicating a first transmission time". Alternatively, as in FIG. 15, the data frame creation unit 40 may include the encrypted time D20 as the "information indicating a first transmission time" in the first plaintext frame. The plaintext time D18 and the encrypted time D20 are the same in "indicating a first transmission time", while they differ in that one is a cleartext and the other is a ciphertext.

In addition, the received data frame processing unit 30 in FIG. 5 may further operate additionally as the above-mentioned consistency confirmation unit. That is, when a second identifier included in the second plaintext frame decrypted from the second encrypted frame is equal to a third identifier included in a third plaintext frame decrypted from a third encrypted frame received previously, the received data frame processing unit 30 as the consistency confirmation unit may discard one of the second and third plaintext frames whose information obtained by decryption points to more recent transmission time.

For example, applying the example of FIG. 17 to the case of transmission from the node apparatus 1B to the node apparatus 1A, the "second plaintext frame" is formed by the ad hoc header D9, the plaintext payload, and the decrypted ciphertext hash value D46 as a plaintext trailer. Herein, the plaintext payload is formed by the decrypted plaintext FID D43, the decrypted plaintext time D44 and the decrypted plaintext body D45. In addition, the "second identifier" corresponds to the decrypted plaintext FID D43.

Then, the received data frame processing unit 30 as the consistency confirmation unit operates as follows. That is, when the plaintext FID D43 is equal to the FID of another data frame that was received previously, the received data frame processing unit 30 discards the data frame whose transmission time (for example, the decrypted plaintext time D44) obtained by decryption is more recent.

Thus, respective units as the data transmission unit and the consistency confirmation unit performs processes using the identifiers (specifically, the FIDs), thereby enabling the node apparatus 1A to detect a frame transmitted from a fraudulent node apparatus.

In addition, the shared key generation unit 3 of each of a plurality of node apparatuses (including the node apparatuses 1A and 1B for example) in the network generates the shared key at intervals of the second time being the same time as described above. Therefore, as long as the respective clocks (for example, the clock 33 in FIG. 5) of the plurality of node apparatuses are synchronized with each other within a range of negligible errors, it follows that the timing at which the shared key is generated in the plurality of apparatuses is synchronized.

However, gaps between the times of the respective clocks of the plurality of node apparatuses may expand in the course of time. Therefore, in the above embodiment, synchronization of timing to generate the shared key is performed between the plurality of node apparatuses within the network by correcting the gaps between the times of the respective clocks of the plurality of node apparatuses.

That is, the first node apparatus 1A has components that cooperatively operate as a time synchronization frame transmission unit. The time synchronization frame transmission unit generates and transmits, as a time synchronization frame, a first time synchronization frame including data indicating a first current time in the first node apparatus 1A and a first synchronization time at which time adjustment was performed in the first node apparatus 1A.

For example, in the example in FIG. 19, the "first synchronization time" in and after step S703 is 12:00, and in step S706, the time synchronization frame P3 including information indicating 13:40 as the "first current time" is transmitted.

Meanwhile, while the time synchronization frame in the above embodiment is encrypted by the time synchronization key, an embodiment in which the time synchronization frame is not encrypted is also possible. Therefore, while the time synchronization unit 9, the time synchronization frame encryption unit 38, the time synchronization frame transmission buffer 42 and the transmission processing unit 44 cooperatively operate as the time synchronization frame transmission unit in the above embodiment, the time synchronization frame encryption unit 38 may be omitted.

In addition, the first node apparatus 1A has components that operate as a time synchronization frame reception unit to receive a second time synchronization frame from the second node apparatus 1B. Here, the second time synchronization frame includes data indicating a second current time (for example, 13:30 in the example of FIG. 19) in the second node apparatus 1B and a second synchronization time (for example, 10:00 in the example of FIG. 19) at which time adjustment was performed in the second node apparatus.

In the above embodiment, the frame branching processing unit 21 and the time synchronization frame reception buffer 23 in FIG. 5 cooperatively operate as the above-mentioned time synchronization frame reception unit.

The first node apparatus 1A further has components that operate as a time updating unit. The time updating unit compares the second synchronization time obtained from the second time synchronization frame and the first synchronization time stored by the first node apparatus 1A. Then, if the second synchronization time is more recent, the time updating unit updates the time of the first node apparatus 1A by setting the second current time as the current time in the first node apparatus 1A.

Specifically, the time synchronization unit 9 in FIG. 5 operates as the time updating unit. In addition, in the above embodiment, since the time synchronization frame is encrypted, the time synchronization frame decryption unit 26 also operates as a part of the time updating unit in order to obtain the second synchronization time from the second time synchronization frame.

In addition, the node apparatus 1A has, as a storage unit, the DRAM 15 for example. The storage unit stores the second synchronization time as the time at which the time synchronization unit 9 as the time updating unit performed time adjustment by updating the time of the first node apparatus 1A. In addition, the shared key generation unit 3 in FIG. 3 and FIG. 5 times the second time according to the time (specifically, the time pointed to by the clock 33 in FIG. 5) updated by the time synchronization unit 9 as the time updating unit.

According to the embodiment overviewed above, when the second node apparatus is an authentic node apparatus, the second node apparatus holds the shared key that is the same for the first node apparatus. Therefore, the first access key generated in the first node apparatus and the second access key generated in the second node apparatus can be exchanged securely using the shared key.

In addition, the first node apparatus can encrypt data using the second access key of the second node apparatus obtained by decryption and transmit it to the second node apparatus. Furthermore, the first node apparatus can also receive, from the second node apparatus, data that is encrypted using the first access key generated by the first node itself.

Thus, according to the embodiment described above, each node apparatus performs operations for encryption autonomously and in cooperation with other node apparatuses. Therefore, even in a network including a very large number of node apparatuses, traffic for exchanging encryption keys does not become concentrated.

In addition, in order for each node apparatus to autonomously perform operations for encryption, the timing to change the shared key, which each node apparatus newly generates and changes according to time, needs to be synchronized. According to the embodiment described above, a node apparatus capable of changing a shared key autonomously while performing synchronization with a simple configuration and without putting load on the network is provided.

Meanwhile, while the node apparatus is mainly described in the embodiment above, a control program to cause a computer to execute the method described above is also included in an example of embodiments of the present invention. The control program may be provided while stored in a computer-readable storage medium such as a magnetic disc, a magneto-optical disc, a nonvolatile semiconductor memory and an optical disc, and may be loaded on a computer and executed by the computer. A transitory medium such as a propagation signal is not included in the computer-readable storage medium.

A computer that executes the control program is embedded in, or connected to a node apparatus not illustrated in the drawing, and controls the above-mentioned node apparatus not illustrated in the drawing according to the control program so that the above-mentioned node apparatus not illustrated in the drawing operates in a similar manner as the node apparatus 1 in the embodiment described above. For example, looking at the embodiment described above from another perspective, it can be said that the MPU 11 being a built-in computer of the node apparatus 1 controls the node apparatus 1 according to a control program stored in a flash memory 16, and causes the node apparatus 1 to perform the various processes described above.

In addition, RC4 exemplified in the embodiment above is an example of encryption algorithms that can be adopted. In some embodiments, encryption and decryption according to another encryption algorithm may be performed. For example, an encryption algorithm other than the stream cipher may be used. In addition, encryption and decryption using the time synchronization key, the shared key, and the access key, respectively, may be those according to different encryption algorithms.

In addition, the formats of the hello frame, the data frame and the time synchronization frame are not limited to the ones exemplified in the embodiments described above, of course. For example, each frame may further include a field that is not exemplified in the embodiments described above. On the other hand, if the frame is of a fixed length, the field of the frame size D8 may be omitted.

In addition, the specific numerical values such as "10 minutes" exemplified in the embodiments above are mentioned merely for aiding understanding, and the specific numerical values may be set in various ways depending on the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A first node apparatus in a network constituted by a plurality of node apparatuses including the first node apparatus and a second node apparatus, the first node apparatus comprising:
   an access key generation device configured to change and generate a first access key being a cryptographic key unique to the first node apparatus at intervals of a first time;
   a shared key generation device configured to change and generate a shared key being same for the plurality of node apparatuses in the network at intervals of a second time being same for the plurality of node apparatuses;
   an access key notification device configured to encrypt, using the generated shared key and transmit, to the second node apparatus, the generated first access key;
   an access key reception device configured to receive an access key notification frame that is transmitted from the second node apparatus and that includes access key notification data being data obtained by encrypting a second access key being a cryptographic key unique to the second node apparatus using the shared key;
   an access key decryption device configured to obtain the second access key from the access key notification data by decrypting the access key notification data using the generated shared key;
   a data transmission device configured to attach, to a first plaintext frame, first signature data obtained by encrypting, using the shared key, data including a first hash value calculated from the first plaintext frame, and to encrypt the first plaintext frame, to which the first signature data is attached, into a first encrypted frame using the second access key obtained by decryption, and to transmit the first encrypted frame;
   a data reception device configured to receive, from the second node apparatus, a second encrypted frame obtained by encrypting, by the first access key, a second plaintext frame to which a second signature data obtained by encrypting data including a second hash value by the shared key is attached;
   a data decryption device configured to decrypt the second encrypted frame by the first access key to obtain the second plaintext frame, to which the second signature data is attached, from the second encrypted frame; and
   a consistency confirmation device configured to obtain the second hash value by decrypting the second signature data using the generated shared key, to calculate a third hash value from the second plaintext frame, and to confirm whether or not the second hash value and the third hash value are consistent with each other.

2. The first node apparatus according to claim 1, wherein the data transmission device includes, in the first plaintext frame, a first identifier for uniquely identifying the first plaintext frame, and information indicating a first transmission time, and
   when a second identifier included in the second plaintext frame decrypted from the second encrypted frame by the data decryption device is equal to a third identifier included in a third plaintext frame decrypted from a third encrypted frame received previously, the consistency confirmation device further discards one of the second plaintext frame and the third plaintext frame whose information obtained from decryption points to a more recent transmission time.

3. The first node apparatus according to claim 2, comprising a time synchronization frame transmission device configured to generate and transmit a first time synchronization frame including data indicating a first current time in the first node apparatus and a first synchronization time on which time adjustment performed in the first node apparatus depends;
   a time synchronization frame reception device configured to receive, from the second node apparatus, a second time synchronization frame including data indicating a second current time in the second node apparatus and a second synchronization time on which time adjustment performed in the second node apparatus depends;
   a time updating device configured to compare the second synchronization time obtained from the second time synchronization frame and the first synchronization time stored by the first node apparatus, and to update a time of the first node apparatus by setting the second current time as a current time in the first node apparatus if the second synchronization time is more recent; and
   a storage device configured to store the second synchronization time as a new first synchronization time on which the time adjustment by the time updating device updating the time of the first node apparatus depends;
   wherein the shared key generation device times the second time according to the time updated by the time updating device.

4. A method executed by a first node apparatus in a network constituted by a plurality of node apparatuses including the first node apparatus and a second node apparatus, the method comprising:
   changing and generating a first access key being a cryptographic key unique to the first node apparatus at intervals of a first time;
   changing and generating a shared key being same for the plurality of node apparatuses in the network at intervals of a second time being same for the plurality of node apparatuses;
   encrypting, using the generated shared key and transmitting, to the second node apparatus, the generated first access key;
   receiving an access key notification frame that is transmitted from the second node apparatus and that includes access key notification data being data obtained by encrypting a second access key being a cryptographic key unique to the second node apparatus using the shared key;
   obtaining the second access key from the access key notification data by decrypting the access key notification data using the generated shared key;
   attaching, to a first plaintext frame, first signature data obtained by encrypting, using the shared key, data including a first hash value calculated from the first plaintext frame;
   encrypting the first plaintext frame, to which the first signature data is attached, into a first encrypted frame using the second access key obtained by decryption;
   transmitting to the second node apparatus the first encrypted frame;
   receiving, from the second node apparatus, a second encrypted frame obtained by encrypting, by the first access key, a second plaintext frame to which a second signature data obtained by encrypting data including a second hash value by the shared key is attached;

decrypting the second encrypted frame by the first access key to obtain the second plaintext frame, to which the second signature data is attached, from the second encrypted frame;

obtaining the second hash value by decrypting the second signature data using the generated shared key;

calculating a third hash value from the second plaintext frame; and confirming whether or not the second hash value and the third hash value are consistent with each other.

5. The method according to claim 4, further comprising:

including, in the first plaintext frame, a first identifier for uniquely identifying the first plaintext frame, and information indicating a first transmission time; and discarding, when a second identifier included in the second plaintext frame decrypted from the second encrypted frame is equal to a third identifier included in a third plaintext frame decrypted from a third encrypted frame received previously, one of the second plaintext frame and the third plaintext frame whose information obtained from decryption points to a more recent transmission time.

6. The method according to claim 5, further comprising:

generating and transmitting a first time synchronization frame including data indicating a first current time in the first node apparatus and a first synchronization time on which time adjustment performed in the first node apparatus depends;

receiving, from the second node apparatus, a second time synchronization frame including data indicating a second current time in the second node apparatus and a second synchronization time on which time adjustment performed in the second node apparatus depends;

comparing the second synchronization time obtained from the second time synchronization frame and the first synchronization time stored by the first node apparatus;

updating a time of the first node apparatus by setting the second current time as a current time in the first node apparatus if the second synchronization time is more recent;

storing the second synchronization time in a storage unit as a new first synchronization time on which the time adjustment by the updating the time of the first node apparatus depends; and timing the second time according to the time updated by the setting.

7. A computer-readable storage device that stores a program to cause a computer that controls a first node apparatus in a network constituted by a plurality of node apparatuses including the first node apparatus and a second node apparatus to execute a process, the process comprising:

changing and generating a first access key being a cryptographic key unique to the first node apparatus at intervals of a first time;

changing and generating a shared key being same for the plurality of node apparatuses in the network at intervals of a second time being same for the plurality of node apparatuses;

encrypting, using the generated shared key and transmitting, to the second node apparatus, the generated first access key;

receiving an access key notification frame that is transmitted from the second node apparatus and that includes access key notification data being data obtained by encrypting a second access key being a cryptographic key unique to the second node apparatus using the shared key;

obtaining the second access key from the access key notification data by decrypting the access key notification data using the generated shared key;

attaching, to a first plaintext frame, first signature data obtained by encrypting, using the shared key, data including a first hash value calculated from the first plaintext frame;

encrypting the first plaintext frame, to which the first signature data is attached, into a first encrypted frame using the second access key obtained by decryption;

transmitting the first encrypted frame;

receiving, from the second node apparatus, a second encrypted frame obtained by encrypting, by the first access key, a second plaintext frame to which a second signature data obtained by encrypting data including a second hash value by the shared key is attached;

decrypting the second encrypted frame by the first access key to obtain the second plaintext frame, to which the second signature data is attached, from the second encrypted frame;

obtaining the second hash value by decrypting the second signature data using the generated shared key;

calculating a third hash value from the second plaintext frame; and confirming whether or not the second hash value and the third hash value are consistent with each other.

* * * * *